(12) United States Patent
Burgess et al.

(10) Patent No.: US 8,490,946 B2
(45) Date of Patent: Jul. 23, 2013

(54) PLANETARY GEAR VALVE

(75) Inventors: Kevin Burgess, Sheridan, WY (US);
David Yakos, Bozeman, MT (US);
Bryan Walthall, Bozeman, MT (US)

(73) Assignee: Big Horn Valve, Inc., Sheridan, WY (US)

( * ) Notice: Subject to any disclaimer, the term of this patent is extended or adjusted under 35 U.S.C. 154(b) by 243 days.

(21) Appl. No.: 13/010,827

(22) Filed: Jan. 21, 2011

(65) Prior Publication Data

US 2012/0187319 A1  Jul. 26, 2012

(51) Int. Cl.
*F16K 5/06* (2006.01)
(52) U.S. Cl.
USPC ... 251/248; 251/286; 251/315.1; 251/315.16; 251/340; 475/149
(58) Field of Classification Search
USPC ....... 251/315.01–315.16, 286–288, 340–341, 251/248, 249.5; 475/149–157
See application file for complete search history.

(56) References Cited

U.S. PATENT DOCUMENTS

| | | | |
|---|---|---|---|
| 2,018,035 A * | 10/1935 | Roth | 251/249.5 |
| 2,482,780 A | 9/1949 | Kirby, Jr. | |
| 2,839,074 A * | 6/1958 | Kaiser | 251/288 |
| 3,113,473 A * | 12/1963 | Morlen | 475/155 |
| 3,194,534 A | 7/1965 | Sachnik | |
| 3,223,111 A * | 12/1965 | Anderson | 251/315.05 |
| 3,591,129 A * | 7/1971 | Hulsey | 251/315.08 |
| 3,771,545 A | 11/1973 | Allen | |
| 3,776,507 A | 12/1973 | Tomlin et al. | |
| 3,830,465 A | 8/1974 | Allen | |
| 4,176,689 A * | 12/1979 | Wrasman | 251/315.04 |
| 4,304,256 A * | 12/1981 | Taiani | 251/286 |
| 4,346,728 A * | 8/1982 | Sulzer | 251/229 |
| 4,819,689 A | 4/1989 | Owsley et al. | |
| 5,070,909 A * | 12/1991 | Davenport | 251/315.12 |
| 5,113,831 A | 5/1992 | Grant | |
| 5,570,581 A * | 11/1996 | Preston | 251/58 |
| 6,080,075 A * | 6/2000 | Wussow et al. | 475/149 |
| 6,708,946 B1 * | 3/2004 | Edwards et al. | 251/58 |
| 7,306,010 B2 | 12/2007 | Gruener, Sr. | |
| 7,504,599 B1 | 3/2009 | Chesters | |
| 2008/0258090 A1 | 10/2008 | Najmolhoda et al. | |
| 2009/0184182 A1 | 7/2009 | Beeren | |
| 2010/0140521 A1 * | 6/2010 | Burgess et al. | 251/315.1 |

* cited by examiner

*Primary Examiner* — John Bastianelli
(74) *Attorney, Agent, or Firm* — Antoinette M. Tease

(57) ABSTRACT

A stemless ball valve comprising a first flange, second flange, ball, inner magnetic cartridge, outer magnetic cartridge, and planetary gear assembly. The inner magnetic cartridge is situated inside of the outer magnetic cartridge, and the inner and outer magnetic cartridges actuate the valve. The planetary gear assembly is situated between the inner magnetic cartridge and the ball. The planetary gear assembly comprises one or more planetary gear phases, each planetary gear phase comprising a step-down gear. Each planetary gear phase comprises one or more planetary gears that engage with the inner teeth of the outer ring of the planetary gear assembly and with a step-down gear.

16 Claims, 28 Drawing Sheets

PLANETARY GEAR VALVE

BACKGROUND OF THE INVENTION

1. Field of the Invention

The present invention relates generally to the field of valves, and more particularly, to a stemless ball valve that utilizes a planetary gear assembly to increase torque from the valve handle to the ball

2. Description of the Related Art

The present invention represents an evolution in ball valve technology beginning with the stemless ball valve disclosed in U.S. patent application Ser. No. 12/331,387, wherein the ball is actuated by an outer magnetic cartridge in magnetic contact with an inner magnetic cartridge that rotates a guide sleeve. The guide sleeve has guide channels into which travel pins on the ball are inserted. The guide channels are shaped and the travel pins are situated so that as the guide sleeve rotates, the travel pins travel inside the guide channels, thereby rotating the ball.

The next related evolution in stemless ball valve technology is represented by the invention disclosed in U.S. patent application Ser. No. 12/890,645. In this invention, the guide sleeve that was situated inside of the inner magnetic cartridge is moved so that it is adjacent to and outside of the inner magnetic cartridge but secured to the inner magnetic cartridge so that when the inner magnetic cartridge rotates, the cartridge guide holder also rotates. The guide sleeve is situated inside of the cartridge guide holder and comprises guide channels into which the travel pins on the ball are inserted. Thus, the ball is rotated in the same manner as in the previous invention, except that a larger ball can be used because the cartridge guide holder and guide sleeve are no longer inside of the inner magnetic cartridge but adjacent to it. The larger ball allows for a valve with greater flow capacity.

Although the two inventions described above solve many of the problems associated with stemmed ball valves, one major drawback of these valves is that they have not been able to match the torque requirements of stemmed valves. In addition, magnetically-actuated valves tend to experience hysteresis, which is a lag that occurs between the outer and inner magnetic cartridges and that becomes more pronounced as the torque required to power a given valve element approaches the maximum torque available from the magnetic drive. When hysteresis is pronounced, slippage may occur between the inner and outer magnetic cartridges, causing the valve to malfunction.

Stemless ball valves are desirable over stemmed valves because there is no penetration from outside of the valve into the valve body. This lack of penetration from the outside reduces emissions and prevents leakage. Until now, the torque of stemless ball valve designs was limited by the torque that could be provided by the magnetic interlock between the inner and outer magnetic cartridges. What was needed was a stemless ball valve that could provide the same torque as a stemmed valve while still providing a leak-free environment.

As described more fully below, the present invention solves this problem by interposing a planetary gear assembly between the inner magnetic cartridge and the ball. This planetary gear assembly greatly increases the torque from the handle outside of the valve (the handle being coupled to the outer magnetic cartridge) to the ball itself, thereby allowing the valve to operate effectively in applications that require higher torque, while still providing the advantages of a stemless ball valve.

BRIEF SUMMARY OF THE INVENTION

The present invention is a stemless ball valve comprising: a first flange; a second flange; a ball; an inner magnetic cartridge; an outer magnetic cartridge; and a planetary gear assembly; wherein the inner magnetic cartridge is situated inside of the outer magnetic cartridge, and wherein the inner and outer magnetic cartridges actuate the valve; and wherein the planetary gear assembly is situated between the inner magnetic cartridge and the ball. In a preferred embodiment, the planetary gear assembly comprises one or more planetary gear phases, and each planetary gear phase comprises a step-down gear. Each step-down gear has a width, and the width of each step-down gear preferably increases from the planetary gear phase closest to the inner magnetic cartridge to the planetary gear phase closest to the ball.

In a preferred embodiment, each planetary gear phase comprises one or more planetary gears, the planetary gear assembly comprises an outer ring with inner teeth, and each planetary gear engages with the inner teeth of the outer ring and with a step-down gear. The inner magnetic cartridge is preferably attached to the planetary gear phase that is closest to the inner magnetic cartridge. The invention preferably further comprises a bull gear on at least one side of the ball, and the bull gear is preferably attached to the planetary gear phase that is closest to the ball.

In a preferred embodiment, the present invention further comprises a ball gear that is attached to the ball, the bull gear and the ball gear each comprises a plurality of teeth, and the teeth on the bull gear engage with the teeth on the ball gear so that when the bull gear rotates, it causes the ball to rotate. The invention preferably further comprising a trunnion axle, the ball gear comprises a center, and the trunnion axle preferably passes through the center of the ball gear.

In a preferred embodiment, the present invention further comprises a trunnion bearing, the ball gear comprises a base portion, the trunnion bearing is situated inside of the base portion of the ball gear, and the trunnion axle rotates inside of the trunnion bearing. The trunnion axle is preferably secured to the second flange.

In a preferred embodiment, the present invention further comprises a flow tube, the valve has a flow path, and the flow tube is situated between the inner magnetic cartridge and the flow path. The invention preferably further comprises two ball gear seal rings that form a collar around the ball. The invention preferably further comprises a spring seal that is situated between the flow tube and one of the two ball gear seal rings.

In a preferred embodiment, the present invention further comprises a bull gear on at least one side of the ball, the bull gear is attached to the planetary gear phase that is closest to the ball, the invention further comprises a ball gear that is attached to the ball, the bull gear and the ball gear each comprises a plurality of teeth, the teeth on the bull gear engage with the teeth on the ball gear so that when the bull gear rotates, it causes the ball to rotate, and the planetary gear assembly, bull gear and ball gear are all located outside of the flow path. The invention preferably further comprises a ball seat on either side of the ball. The invention preferably further comprises a ball stop on the ball that interacts with the second flange to prevent the ball from rotating more than ninety degrees.

REFERENCE NUMBERS

Figure 1:
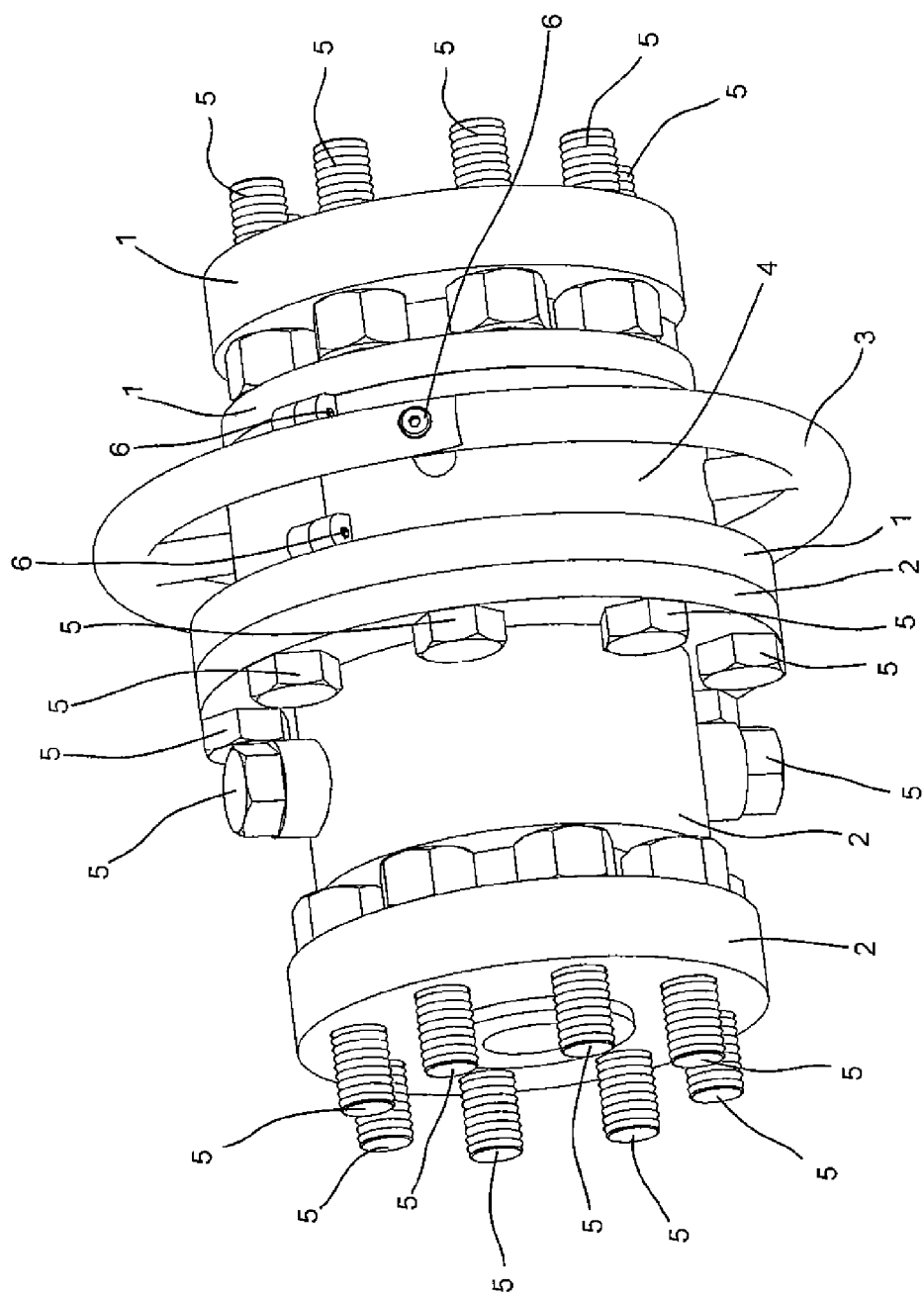
FIG. 1 is a perspective view of the valve fully assembled.

1 First flange
2 Second flange
3 Handle (wheel actuator)
4 Outer magnetic cartridge
5 Bolt
6 Screw
7 Magnetic cartridge assembly
8 Flow tube assembly
9 Planetary gear assembly
10 Ball assembly
11 Flange assembly
12 Tube
13 Inner magnetic cartridge
14 Bull gear
15 Ball gear
15a Base (of ball gear)
16 Ball
17 Ball seat
18 Trunnion (trunnion axle)
18a Channel (in trunnion)
19 O-ring
20 Spring seal
21 Rubber gasket
22 Outer ring
23 Inner teeth (of outer ring)
24 First disc
25 First step-down gear
26 Planetary gear (of first planetary gear phase)
27 First planetary gear phase
28 Second step-down gear
29 Planetary gear (of second planetary gear phase)
30 Second planetary gear phase
31 Third step-down gear
32 Planetary gear (of third planetary gear phase)
33 Third planetary gear phase
34 Interface disc (of first planetary gear phase)
35 Circular bracket (of first planetary gear phase)
36 Pin
37 Interface disc (of second planetary gear phase)
38 Circular bracket (of second planetary gear phase)
39 Circular bracket (of third planetary gear phase)
40 Interface disc (of third planetary gear phase)
41 Ball gear seal ring
42 Trunnion bearing
43 Key
44 Slot
45 Male part (of bull gear)
46 Female part (of bull gear)
100 Valve

DETAILED DESCRIPTION OF INVENTION

The present invention is a stemless ball valve that utilizes a planetary gear assembly to increase torque from the handle (wheel actuator) of the valve to the ball. The planetary gear assembly is situated between the inner and outer magnetic cartridges, which are in magnetic contact with one another, and the ball itself. The ball comprises two ball gears that are in contact with a bull gear that surrounds the ball. As the bull gear rotates, it causes the ball gears to rotate, thereby rotating the ball and opening and closing the valve. The bull gear in turn is coupled to the last of the planetary gear phases. In a preferred embodiment, the valve trunnions (or trunnion axles) pass through the center of each ball gear, and the ball rotates on the trunnions. The entire gear system—the planetary gear assembly, bull gear and ball gears—is located outside of the flow path so as to prevent debris from coming into contact with the gears.

The present invention is not limited to any particular number of phases in the planetary gear assembly, but the preferred embodiment comprises three phases. The first planetary gear phase is coupled to the inner magnetic cartridge; the second planetary gear phase is coupled to the third planetary gear phase; and the third planetary gear phase is coupled to the bull gear. Due to the unique structural configuration described below and illustrated in the accompanying figures, the torque of the valve is increased with each phase of the planetary gear assembly. The planetary gear assembly also decreases the rate of rotation with each phase so that the bull gear rotates at a greatly reduced rate relative to the rotation of the inner magnetic cartridge.

In this manner, the torque applied to the wheel actuator is amplified by the time it reaches the bull gear on the other end of the planetary gear assembly. In the preferred embodiment shown in the figures and described below, the torque between the inner magnetic cartridge and the bull gear (which drives the ball gears on the ball) is multiplied by a factor of 13.2—a significant advantage over previous stemless ball valve designs. Another advantage of the present invention is that the magnetic drive system (i.e., the inner and outer magnetic cartridges) is able to operate at a fraction of its total power capability and yet still have sufficient torque available to actuate the valve, thereby avoiding the hysteresis issue described above.

The planetary gear assembly of the present invention reduces the overall torque requirements of the magnetic drive system, but it also requires much more motion at the upper (actuating) end. In the preferred embodiment, the planetary gear assembly increases torque to the valve by a factor of roughly 13:1, but it also requires 13 times more rotation from the inner magnetic cartridge in order to turn the valve. By way of example, a quarter-turn ball valve (90 degrees of rotation) requires 1170 (13 times 90) degrees of motion from the inner magnetic cartridge, or 3¼ complete rotations, in order to move the valve ¼ turn.

This requirement of increased motion at the upper end of the valve is actually an advantage when the outer cartridge of the magnetic drive system is powered by an electric or pneumatic motor because the accuracy of the motor is enhanced by a factor of 13. For example, if an electric motor has a ten-degree margin of error in position, that error is reduced 13 times by the planetary gear assembly, and the resulting error in the position of the valve is less than one degree.

FIG. 1 is a perspective view of the valve fully assembled. This figure shows a first flange 1, a second flange 2, a handle 3 (also referred to as the "wheel actuator"), and an outer magnetic cartridge 4. Bolts 5 (for ease of reference, the bolts and corresponding nuts are both labeled as reference number 5) are used to secure the valve to piping (not shown). Bolts 5 are also used to secure the first and second flanges to each other and to hold the trunnions 18 (also referred to as the "trunnion axles"), which pass through the center of the ball gears 15 on the ball 16 (see FIG. 4), in place. In a preferred embodiment, the bolts 5 do not thread into the trunnions 18 but rather abut up against them to prevent the trunnions from pushing outward due to the force of the flow in the valve. As shown more clearly in FIGS. 4 and 12, the trunnions rotate inside of a trunnion bearing 42 that is press fit into the base 15a of the ball gear 15.

Figure 2:
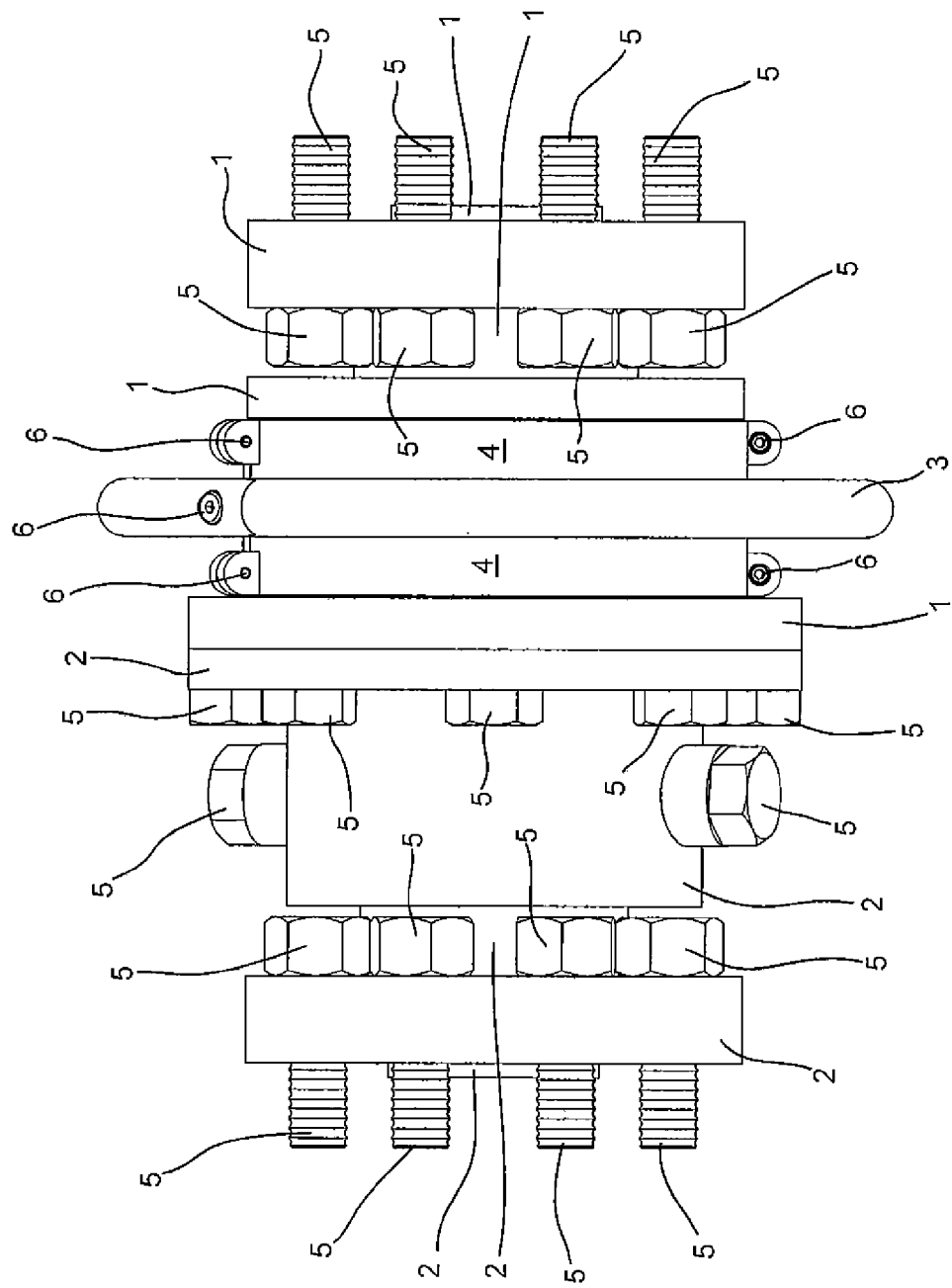
FIG. 2 is a side view of the valve fully assembled.
Figure 5:
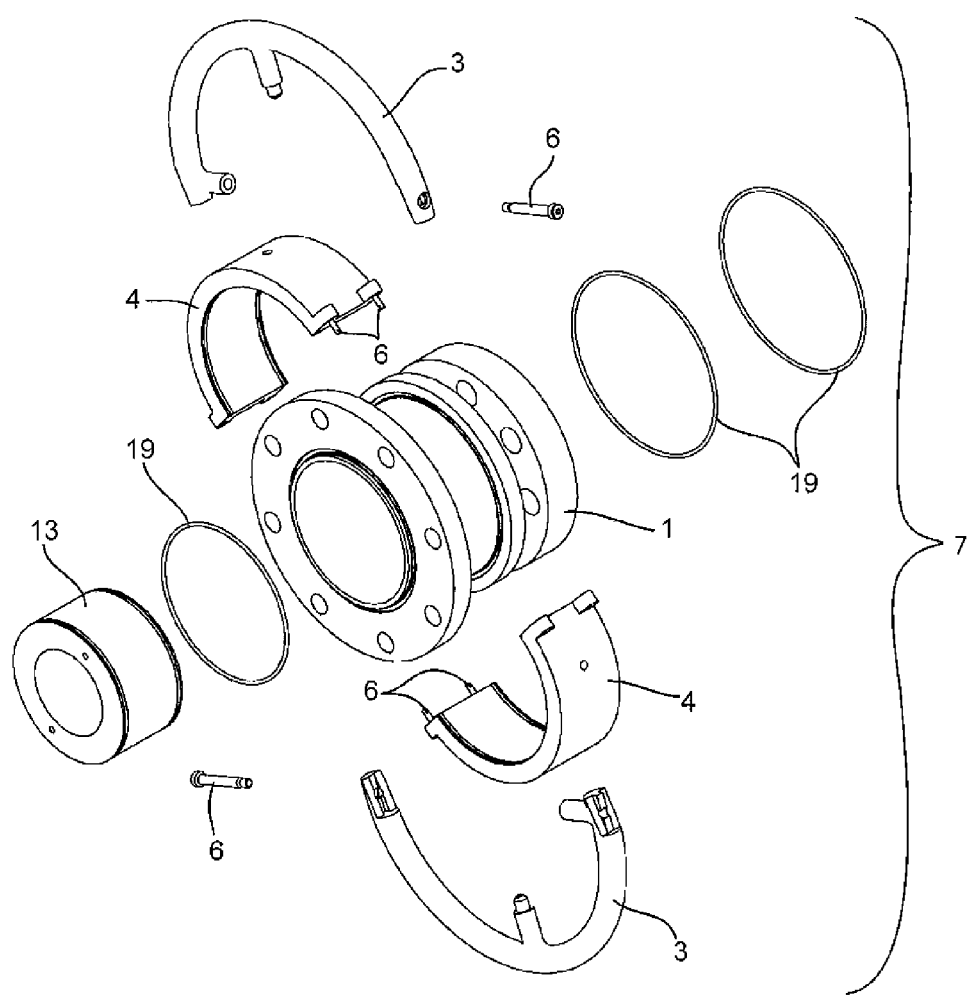
FIG. 5 is an exploded view of the magnetic cartridge assembly.

As shown more clearly in FIG. 5, the outer magnetic cartridge 4 is preferably comprised of two semi-circular halves that are joined together with screws 6. The wheel actuator 3 is also preferably comprised of two semi-circular parts that are joined together with screws 6. FIG. 2 is a side view of the valve fully assembled.

Figure 3:
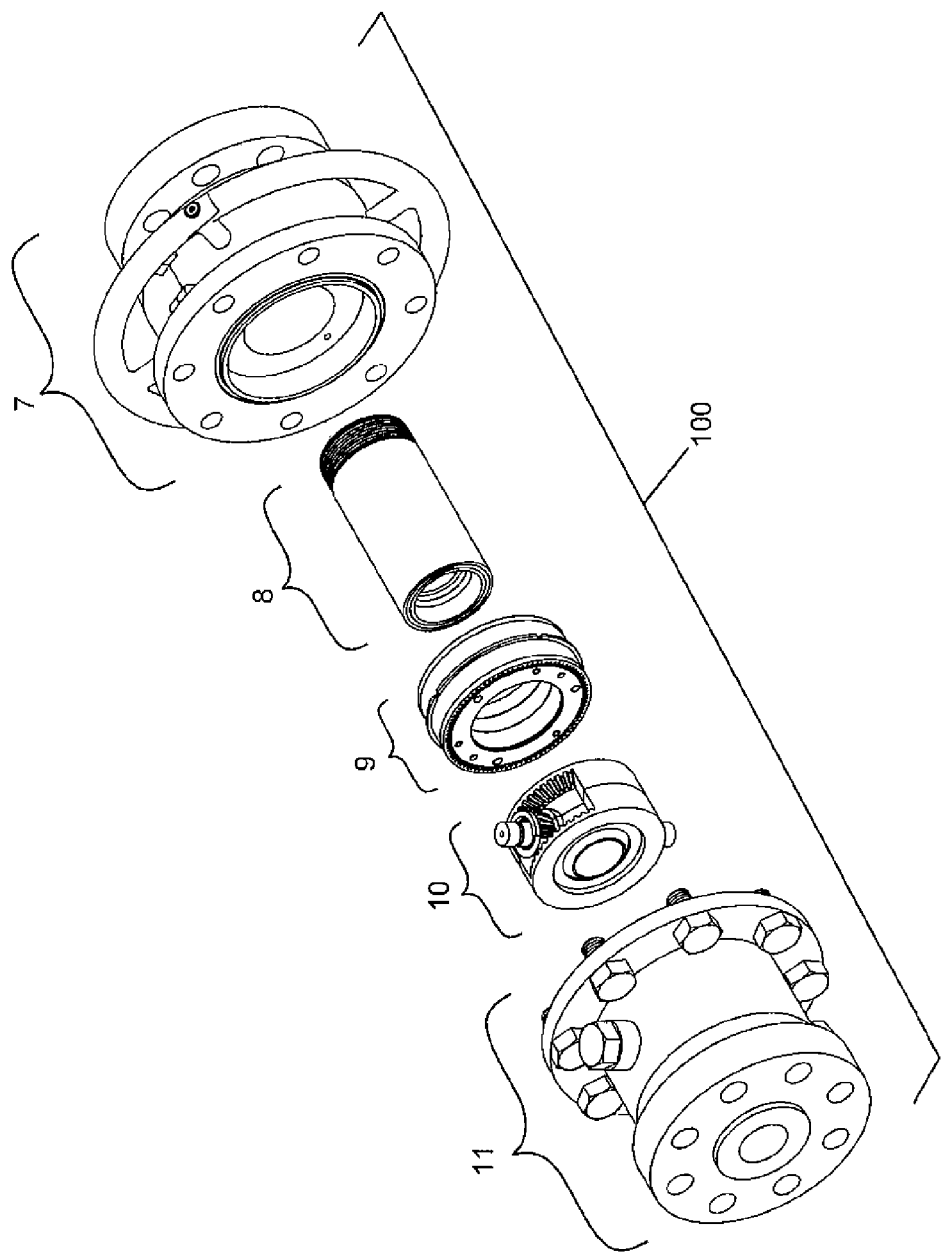
FIG. 3 is an exploded view of the valve.

FIG. 3 is an exploded view of the valve 100. This figure shows the various assemblies comprising the valve, each of which is shown in further details in subsequent figures. The magnetic cartridge assembly 7 provides the magnetic actuation for the valve. The flow tube assembly 8 provides a flow path for the valve and a magnetic barrier between the inner and outer magnetic cartridges. The planetary gear assembly 9 provides the increase in torque from the inner magnetic cartridge to the bull gear (included in the ball assembly). The ball assembly 10 includes the bull gear, ball gears and ball. The flange assembly 11 secures the trunnion axles to the second flange. Each of these sub-assemblies is described below in greater detail.

Figure 4:
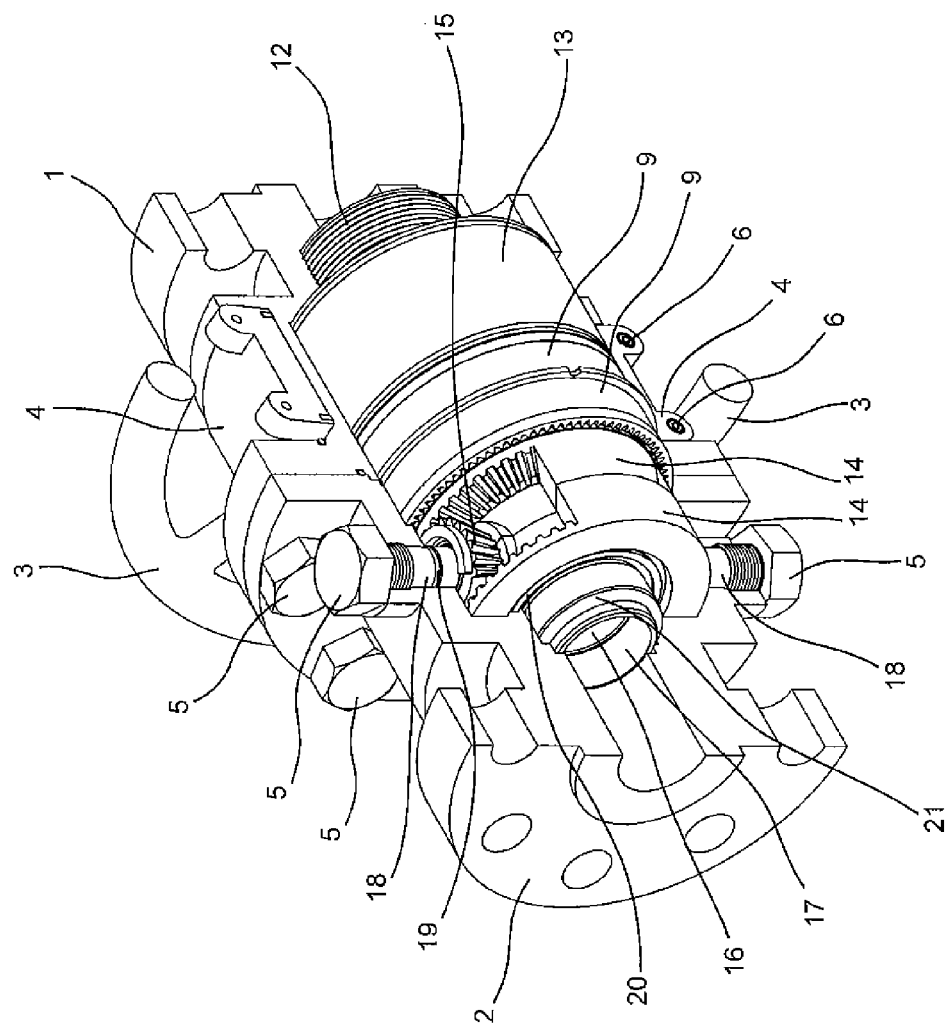
FIG. 4 is a cutaway view of the valve showing the various assemblies that comprise the valve.

FIG. 4 is a cutaway view of the valve showing the various assemblies that comprise the valve. This figure shows the tube 12 of the flow tube assembly 8, the inner magnetic cartridge 13 of the magnetic cartridge assembly 7, the planetary gear assembly 9, the bull gear 14 and one of two ball gears 15 (see also FIG. 12) on the ball 16. A ball seat 17 lies between the ball 16 and the second flange 2 (see FIG. 13 for greater clarity). As noted above, the trunnion axles 18 pass through the center of each ball gear 16 and are secured to the second flange 2 with bolts 5.

FIG. 5 is an exploded view of the magnetic cartridge assembly. This figure shows the first flange 1, the wheel actuator 3, the outer magnetic cartridge 4, and the inner magnetic cartridge 13. It also shows the 0-rings 19 that lie on either side of the outer magnetic cartridge 4 and between the first and second flanges 1, 2. Note that a portion of the first flange 1 is situated between the inner and outer magnetic cartridges 13, 4 so that the two magnetic cartridges do not physically come into contact with one another. The wheel actuator 3 is preferably bolted onto the outer magnetic cartridge 4 so that as the wheel actuator 3 rotates, the outer magnetic cartridge 4 rotates as well. The inner and outer magnetic cartridges 13, 4 are aligned so that they are in magnetic, but not physical, contact with one another (see also FIGS. 14 and 15); therefore, rotation of the outer magnetic cartridge 4 causes the inner magnetic cartridge 13 to rotate in the same direction.

Figure 6:
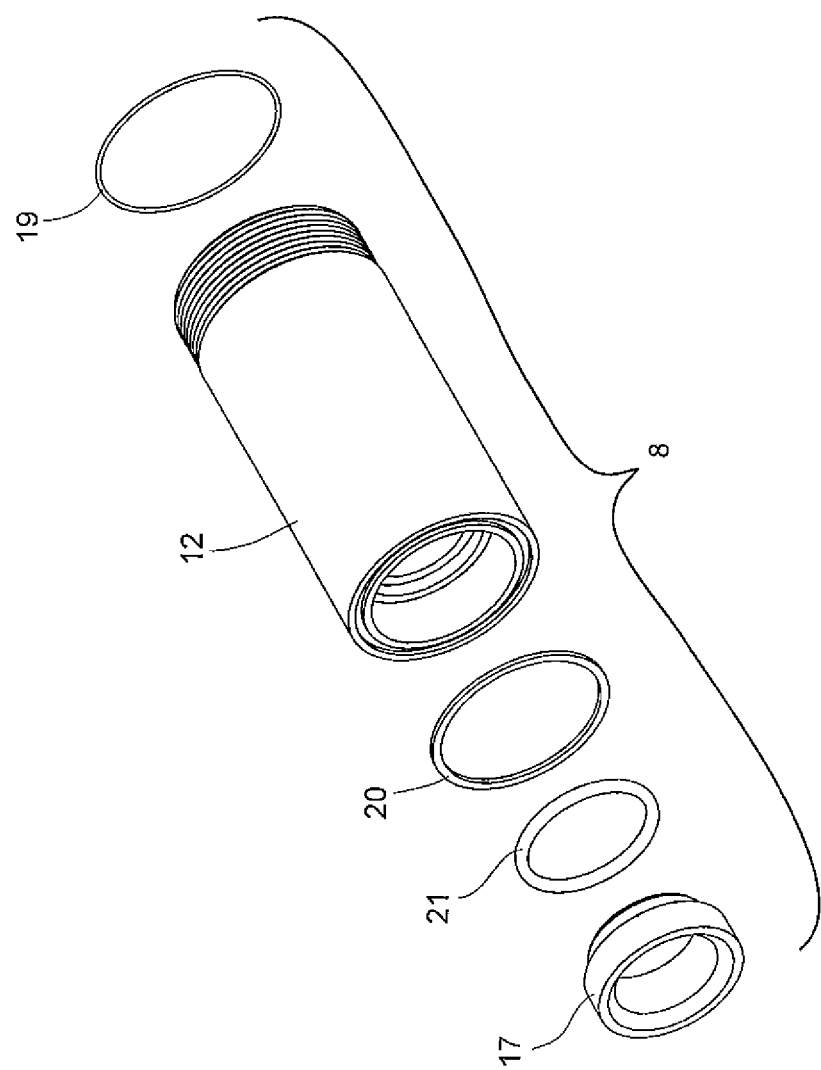
FIG. 6 is an exploded view of the flow tube assembly.

FIG. 6 is an exploded view of the flow tube assembly. The function of the flow tube 12 is to act as a physical barrier between the magnetic cartridge assembly 7 and the flow path, provide a rigid sealing surface for the ball seat 17, and protect the flow path from magnetic fields that could disrupt the flow. The reason it is important to create a barrier between the magnetic cartridge assembly 7 and the flow path is to avoid creating a magnetic field in the flow path that might cause debris to build up around the insides of the flow path (tube), thereby decreasing the rate of flow and rendering the valve less effective. The thickness of the flow tube 12 will depend on the strength and size of magnets used in the inner and outer magnetic cartridges and what percentage of the magnetic field needs to be blocked out from the flow path.

FIG. 6 also shows the O-ring 19 that lies between the flow tube 12 and the first flange 1. In a preferred embodiment, a rubber gasket 21 lies between the flow tube 12 and the ball seat 17, and a spring seal 20 lies between the flow tube 12 and ball gear seal ring 41 (not shown). The spring seal 20 acts as a seal between the flow tube 12 and the ball gear seal ring 41. The rubber gasket 21 acts as a spring that holds the ball seat 17 against the ball 16, and it also acts as a seal between the flow tube 12 and the ball seat 17. As shown in this figure and FIGS. 13 and 26, the ball seat 17 comprises two halves that together form a collar around the ball 16.

Figure 7:
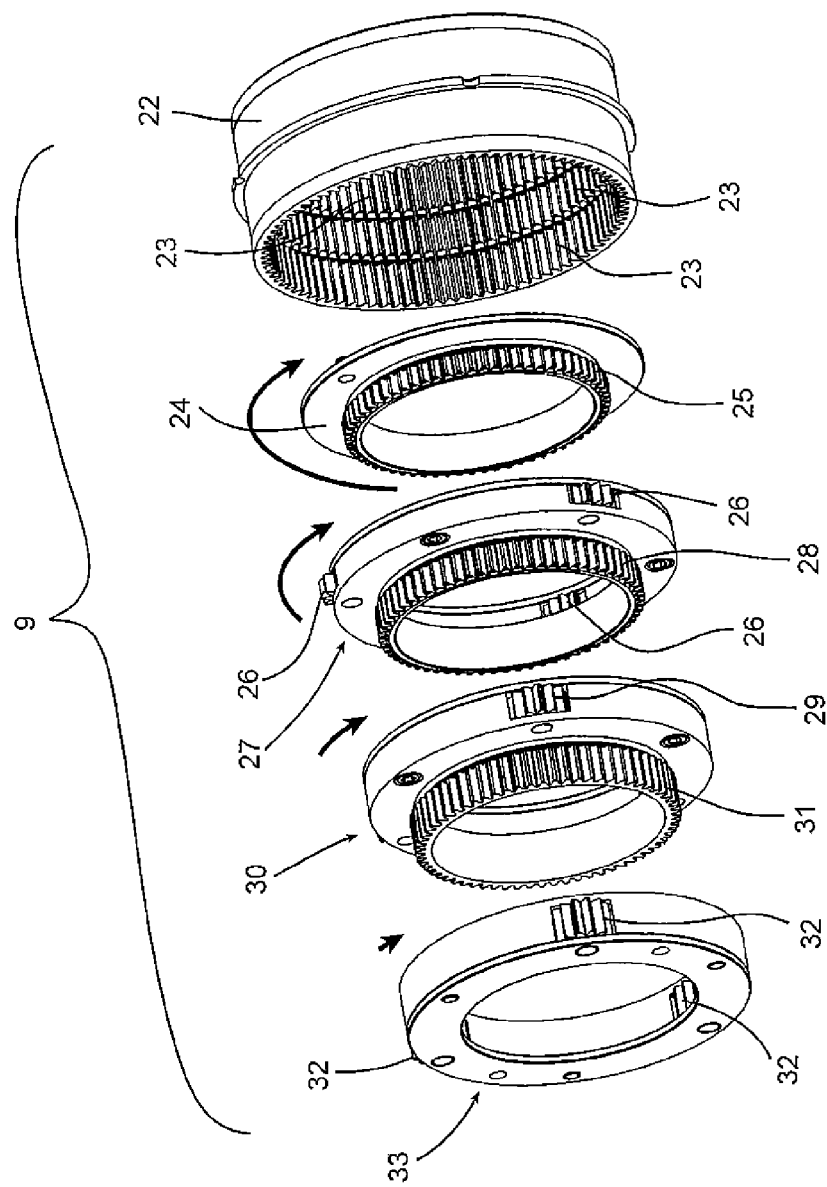
FIG. 7 is an exploded view of the planetary gear assembly.

FIG. 7 is an exploded view of the planetary gear assembly. As shown in this figure, the planetary gear assembly 9 comprises an outer ring 22 with inner teeth 23 that extend around the inner perimeter of the outer ring 22. In this embodiment, three phases of planetary gears are shown, but the present invention is not limited to any particular number of planetary gear phases. The planetary gear assembly 9 comprises a first disc 24 that is attached to the inner magnetic cartridge 13 (not shown) and that rotates with the inner magnetic cartridge 13. The first disc 24 comprises a first step-down gear 25 that turns the planetary gears 26 on the first planetary gear phase 27. The first planetary gear phase 27 comprises a second step-down gear 28 that turns the planetary gears 29 on the second planetary gear phase 30. The second planetary gear phase 30 comprises a third step-down gear 31 that turns the planetary gears 32 on the third planetary gear phase 33. The third planetary gear phase 33 has no step-down gear because it is attached to the bull gear 14 (not shown).

Each planetary gear phase preferably comprises three planetary gears, but the present invention is not limited to any particular number of planetary gears per planetary gear phase. Note that the planetary gears of each planetary gear phase engage with the teeth 23 on the inside of the outer ring 22 as well as with the teeth on the step-down gear of the previous planetary gear phase. Note also that the step-down gears 25, 28, 31 are increasingly wider as compared to the previous step-down gear; the reason for the increase in width of the step-down gears is because the torque is increasing from one planetary gear phase to the next.

Figure 8:
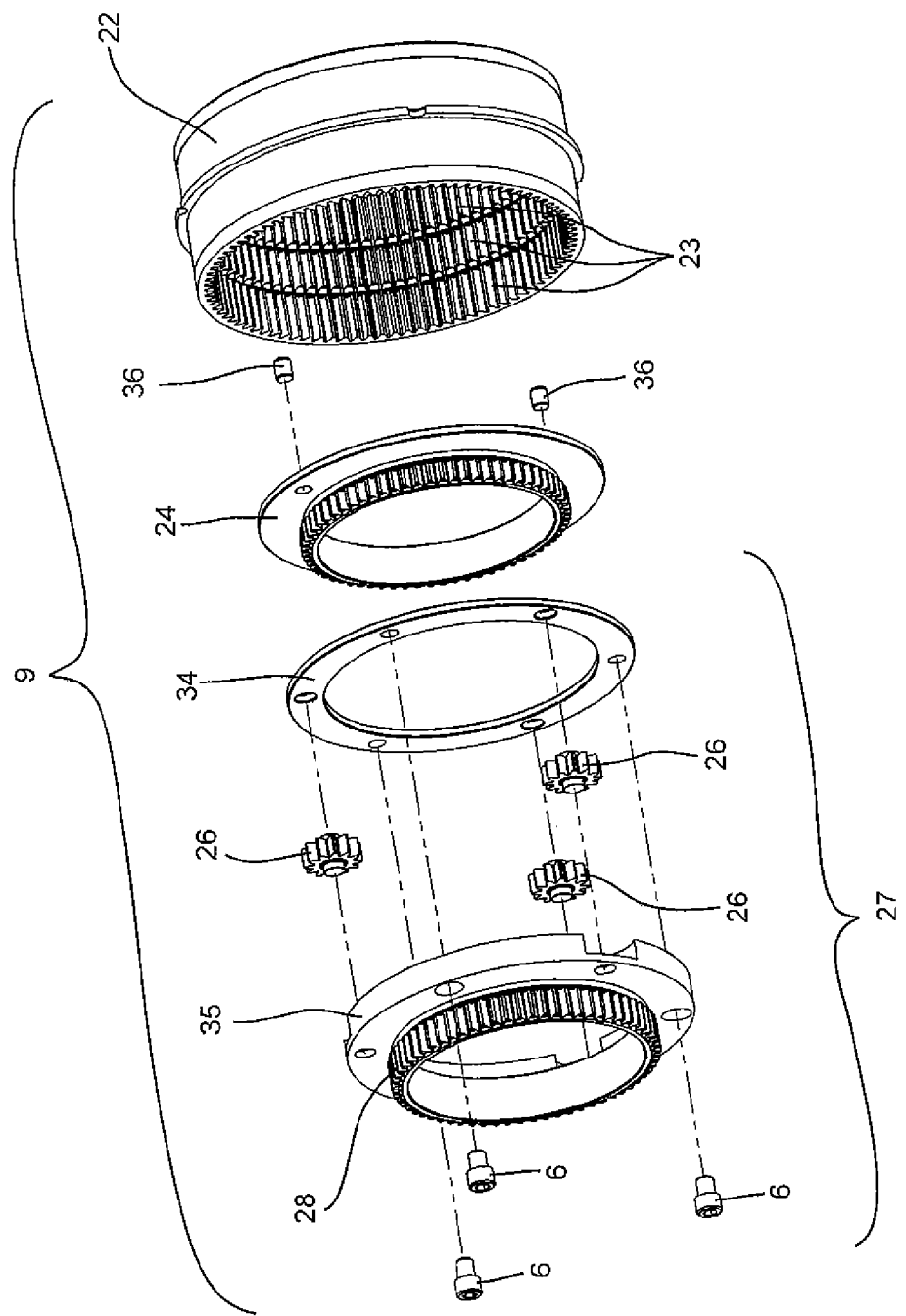
FIG. 8 is a first partial exploded view of the planetary gear assembly.

FIG. 8 is a first partial exploded view of the planetary gear assembly. This figure shows the outer ring 22, first disc 24 and first planetary gear phase 27. The first planetary gear phase 27 comprises an interface disc 34, three planetary gears 26, and a circular bracket 35 comprising the first step-down gear 28. Pins 36 or other fastening mechanisms are used to secure the first disc 24 to the inner magnetic cartridge 13 (not shown), and screws 6 are used to secure the circular bracket 35 to the interface disc 34.

Figure 9:
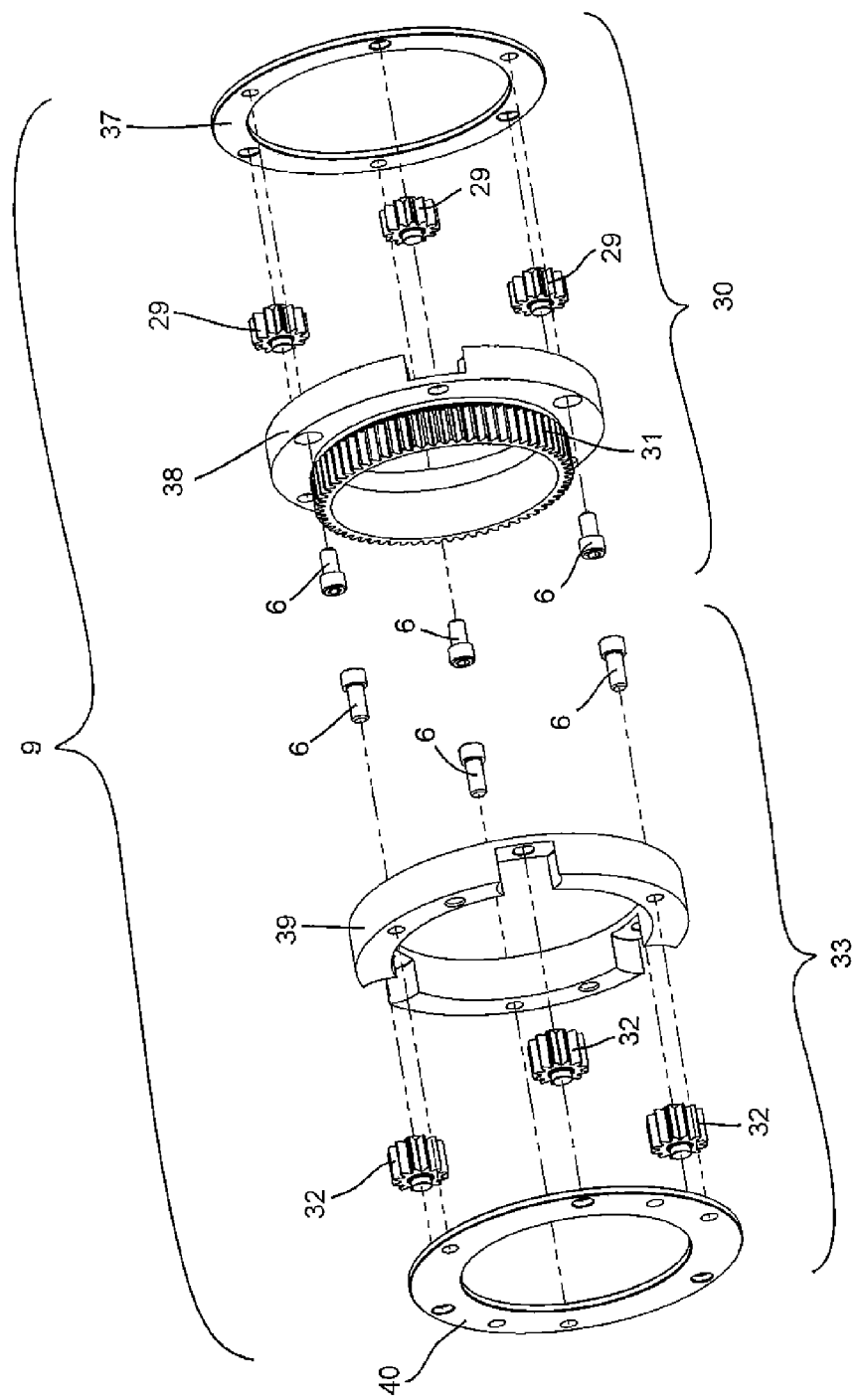
FIG. 9 is a second partial exploded view of the planetary gear assembly.

FIG. 9 is a second partial exploded view of the planetary gear assembly. As shown in this figure, the second planetary gear phase 30 comprises an interface disc 37, three planetary gears 29, and a circular bracket 38 comprising the second step-down gear 28. The third planetary gear phase 33 comprises a circular bracket 39 that houses the planetary gears 32 and an interface disc 40. The circular bracket 39 of the third planetary gear phase (or whichever planetary gear phase is the last one before the bull gear) does not comprise a step-down gear. Screws 6 or other fastening mechanisms are used to secure the circular bracket 38 to the interface disc 37 of the second planetary gear phase 30 and the circular bracket 39 to the interface disc 40 of the third planetary gear phase 33.

Figure 10:
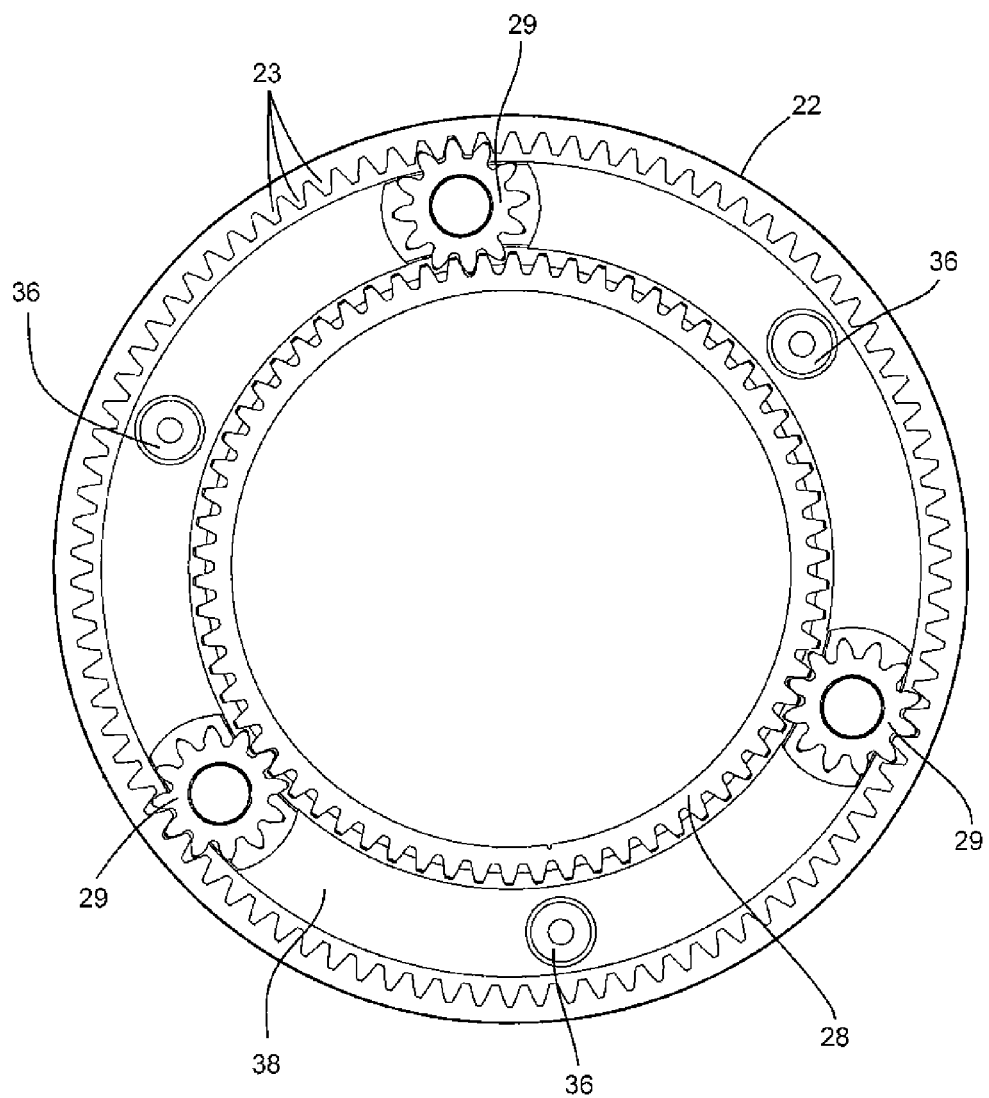
FIG. 10 is a section view of the planetary gear assembly.

FIG. 10 is a section view of the planetary gear assembly. This section view is taken through the middle of the circular bracket 38 of the second planetary gear phase 30. In this figure, the step-down gear 31 on the circular bracket 38 of the second planetary gear phase 30 is not shown because the section has been taken behind it. The planetary gears 29 of the second planetary gear phase 30 are engaged with the inner teeth 23 on the outer ring 22 and also with the step-down gear 28 of the first planetary gear phase 27.

Figure 11:
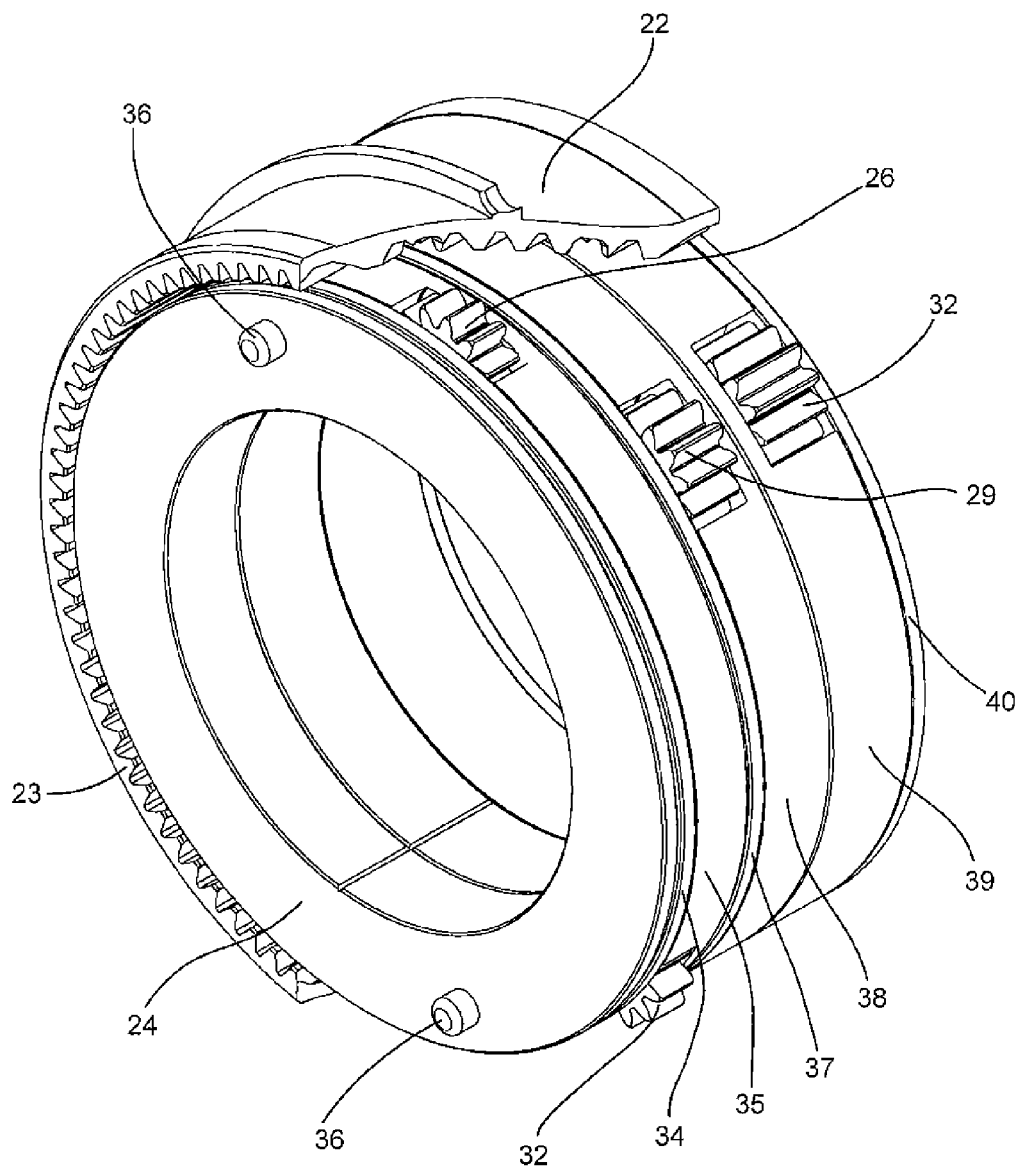
FIG. 11 is a cutaway view of the planetary gear assembly.

FIG. 11 is a cutaway view of the planetary gear assembly. This figure shows the first disc 24 and first, second and third planetary gear phases 27, 30, 33 in their assembled state.

Figure 12:
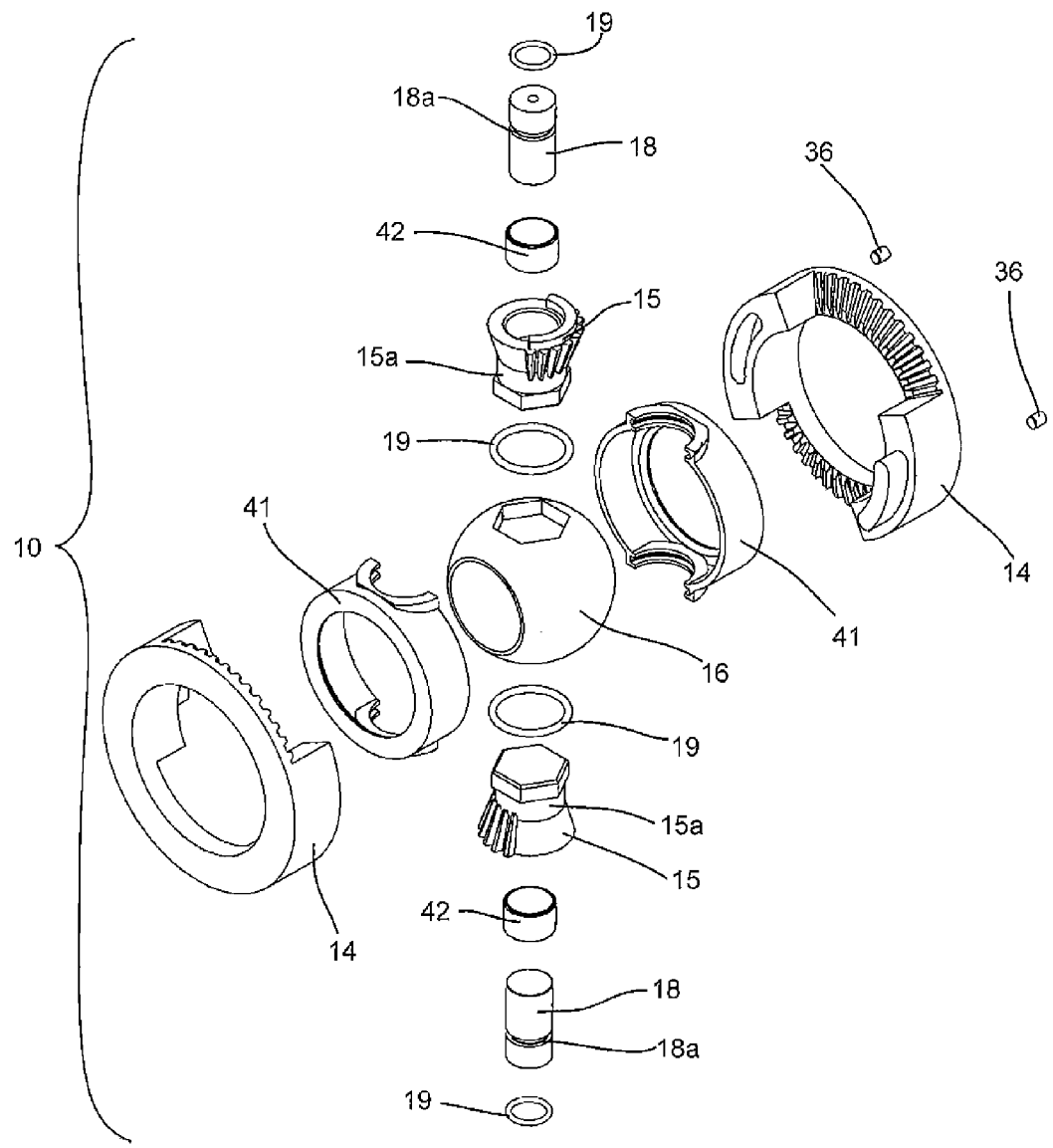
FIG. 12 is an exploded view of the ball assembly.

FIG. 12 is an exploded view of the ball assembly. The ball assembly 10 comprises a bull gear 14, which, as shown in this figure, is comprised of two halves that surround the ball 16. The ball assembly 10 also comprises a ball gear seal ring 41 on either side of the ball 16 that provides a seal around the base 15a of the ball gear 15. Pins 36 attach one half of the bull gear 14 to the interface disc 40 (see FIG. 9) of the third planetary gear phase 33 so that the bull gear 14 turns at the same rate as the third planetary gear phase 33. In a preferred embodiment, the outside diameter of the bull gear 14 is the same as the outside diameter of the interface disc 40 of the third planetary gear phase 33 (and as the circular bracket 39 of the third planetary gear phase 33), but the present invention does not require that the outside diameter of the bull gear 14 be the same as the outside diameter of the interface disc 40 or the circular bracket 39.

The ball gears 15 are situated on either side of the ball 16 and are preferably press fit into the ball 16. Note that the teeth on the ball gear do not extend around the entire perimeter of the ball gear, nor do the teeth on the bull gear 14. The reason the teeth do not extend around the entire perimeter of the ball gears or the bull gear is because they only need to turn the ball 16 ninety degrees (90°) to open and close the valve. In between the ball gears 15 and the ball 16 are O-rings 19. Although the ball gear 15 is shown in the figures as a bevel gear (i.e., with a flat base and a beveled top), the present invention is not limited to any particular configuration of the ball gear as long as it comprises teeth that engage with the bull gear.

A trunnion axle 18 extends through a trunnion bearing 42 and through the center of each ball gear 15. The trunnion bearing 42 is situated inside of the base 15a of the ball gear 15 and surrounds the end of the trunnion axle 18 that is inserted into the ball gear 15. As explained above, the trunnion 18 rotates within the trunnion bearing 42. An O-ring 19 is preferably inserted around each of the trunnion axles at a channel 18a in the perimeter of the trunnion axle 18. The O-ring 19 secures the trunnion 18 inside of the second flange 2 and prevents it from rotating.

Figure 12A:
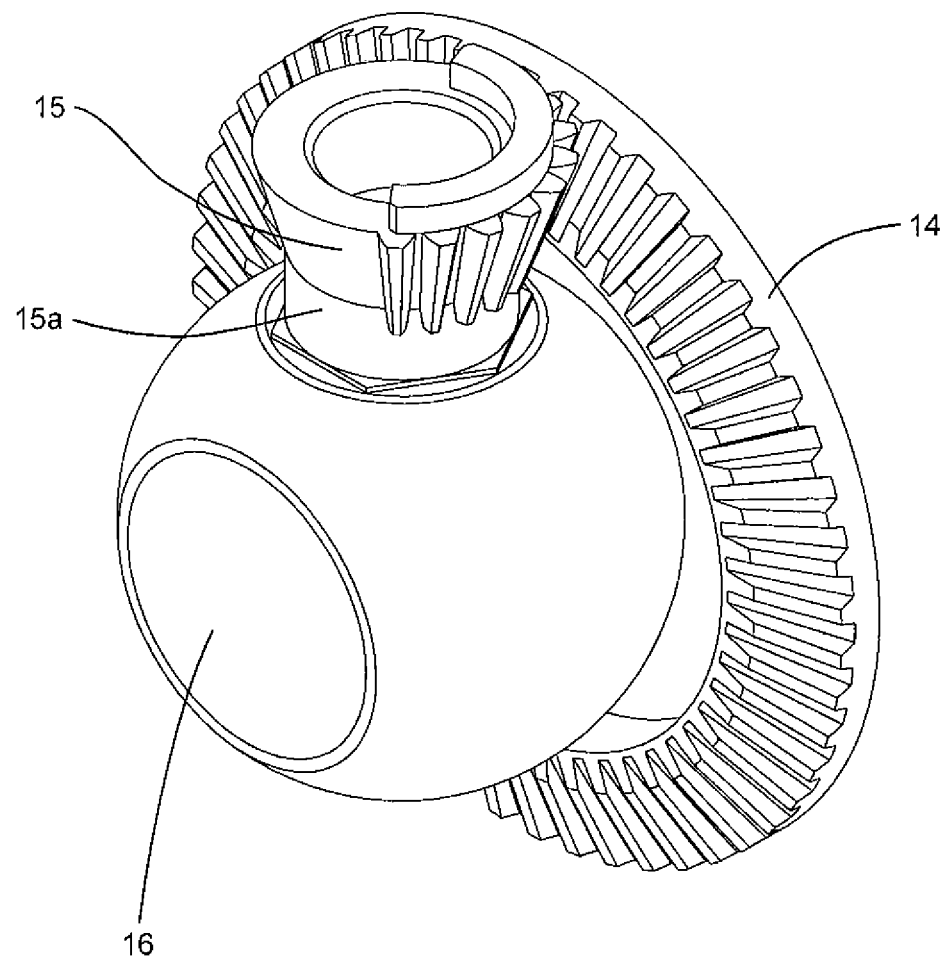
FIG. 12A is a perspective view of the single bull gear embodiment.

Although FIG. 12 shows two a single bull gear comprised of two halves, the present invention could operate with only one half of the bull gear 14, as shown in FIG. 12A, and a single ball gear 15. In this embodiment, there is a bull gear 14 (comprised of one half of the bull gear 14 shown in FIG. 12) and a single ball gear 15, and the single bull gear 14 causes the ball gear 15 to rotate (thereby rotating the ball 16), as described above. The two-part bull gear and two ball gears are preferred, however, for strength and stability of the valve. As used in the claims, the term "bull gear" refers either to the bull gear embodiment comprised of two halves and shown in FIG. 12 or to the bull gear embodiment comprised of a single half and shown in FIG. 12A.

Figure 13:
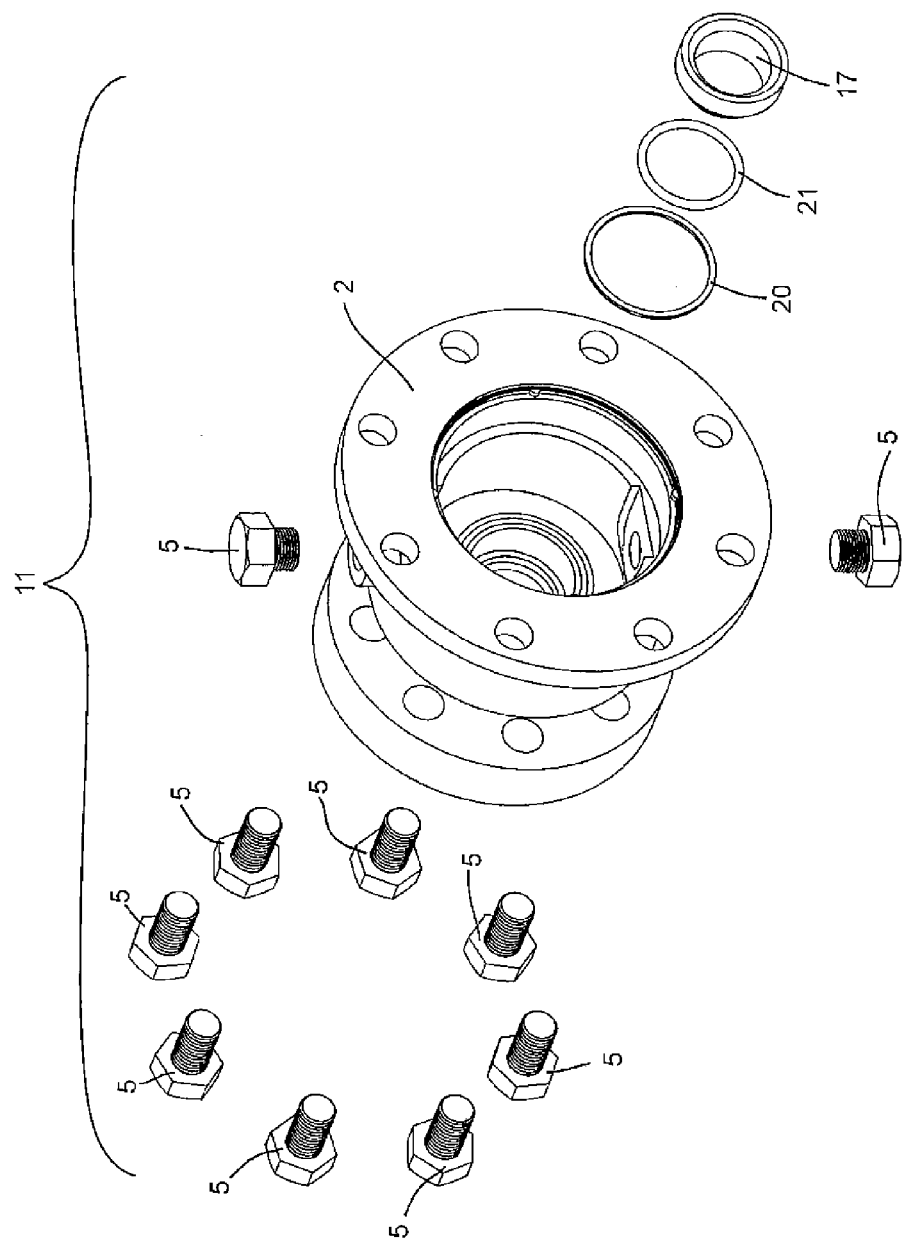
FIG. 13 is an exploded view of the flange assembly.

FIG. 13 is an exploded view of the flange assembly. This figure shows the second flange 2 and the bolts 5 that secure the trunnion axles 18 (not shown) in the second flange. This figure also shows the bolts 5 that are used to secure the second flange 2 to the first flange 1. (The bolts that secure the second flange 2 to the piping are not shown.) Also shown are the other half of the ball seat 17 and the rubber gasket 21 that lies between the ball seat 17 and the second flange 2. The spring seal 20 is situated between the second flange 2 and the ball gear seal ring 41.

An important design aspect of the present invention is that much of the force being applied to the ball 16 is able to be absorbed by the trunnion axles 18. In previous stemless ball valve designs, the seals took much of the force, which caused them to wear out more quickly. By using heavy duty trunnion axles, the pressure—which can exceed several tons—is taken off of the downstream seal and ball seat and applied to the heavy trunnion axles.

Figure 14:
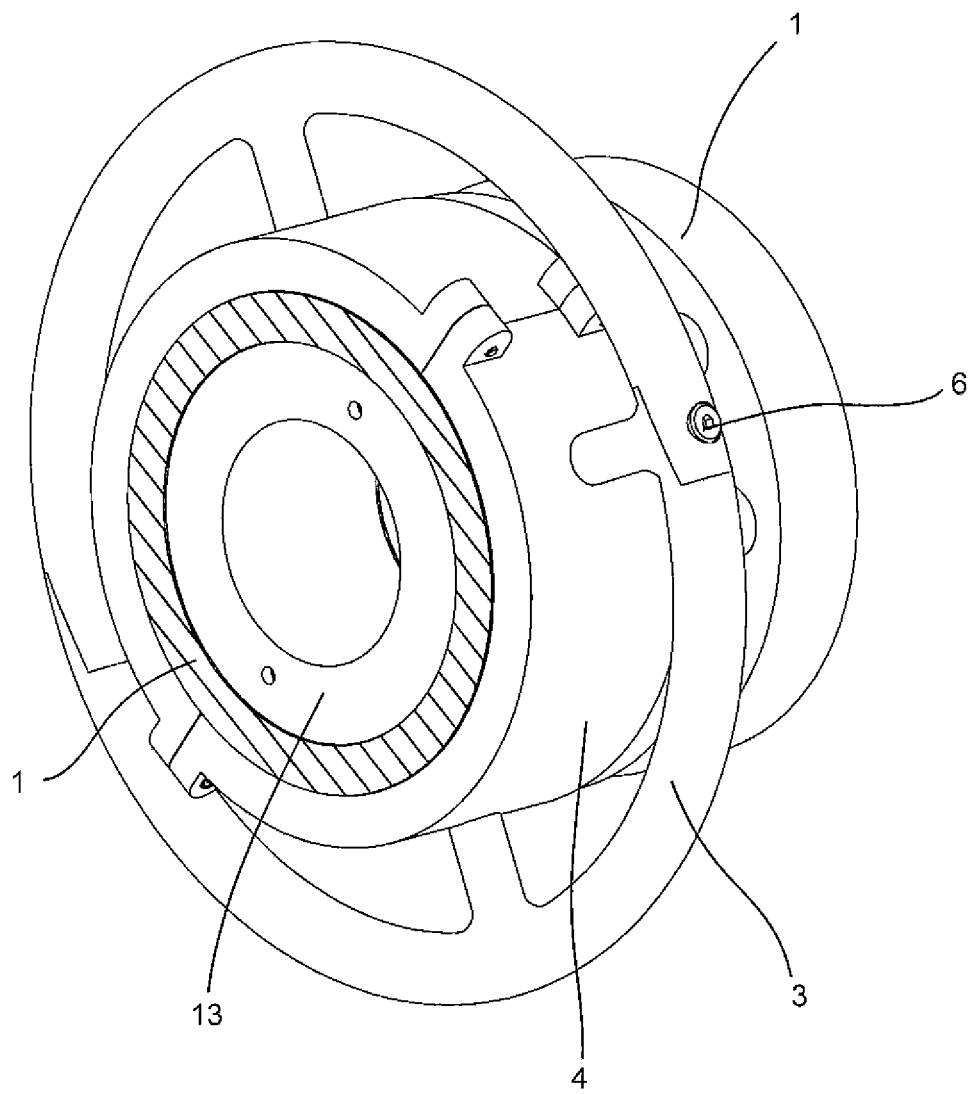
FIG. 14 is a perspective section view of the magnetic cartridge assembly showing the inner and outer magnetic cartridges.

FIG. 14 is a perspective section view of the magnetic cartridge assembly showing the inner and outer magnetic cartridges. As shown in this figure, the inner magnetic cartridge 13 lies inside of the outer magnetic cartridge 4 with a portion of the first flange 1 in between them.

Figure 15:
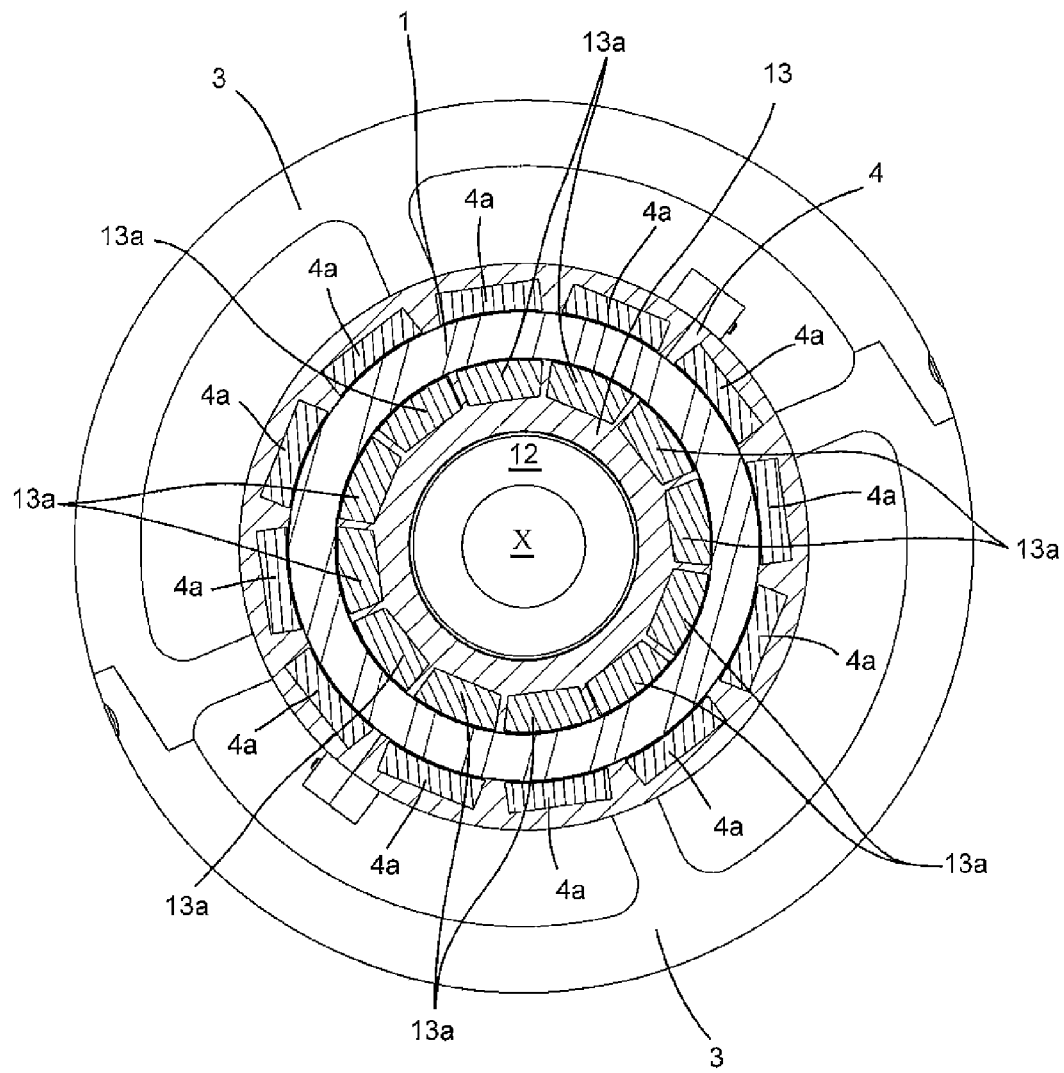
FIG. 15 is a section view of the magnetic cartridge assembly showing the orientation of the magnets comprising the inner and outer magnetic cartridges.

FIG. 15 is a section view of the magnetic cartridge assembly showing the orientation of the magnets comprising the inner and outer magnetic cartridges. This figure is illustrative of a preferred orientation of the inner 13a and outer 4a magnets, but the present invention is not limited to any particular configuration of the magnets within the inner 13 and outer magnetic cartridges 4. In this figure, the flow path is designated with an "X."

Figure 16:
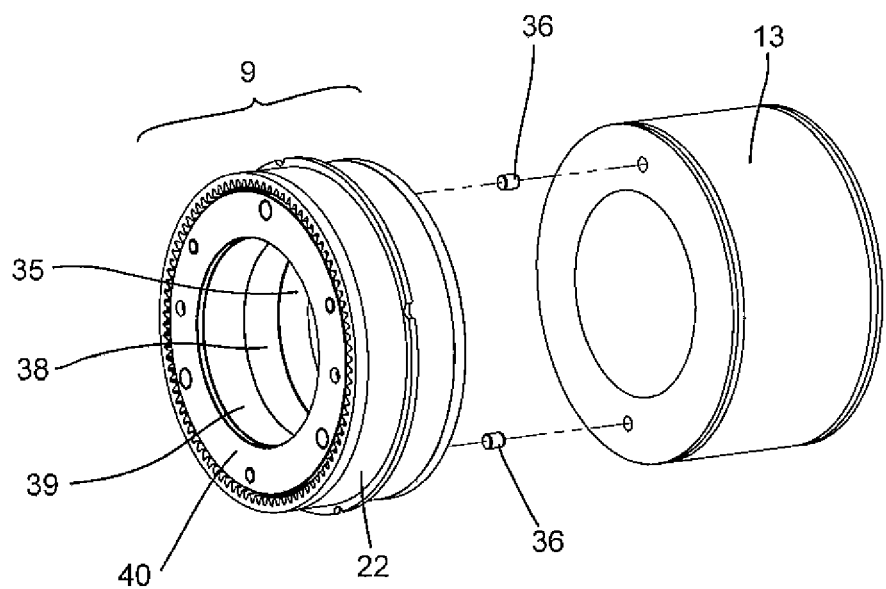
FIG. 16 is a partial exploded view of the inner magnetic cartridge and the planetary gear assembly.
Figure 17:
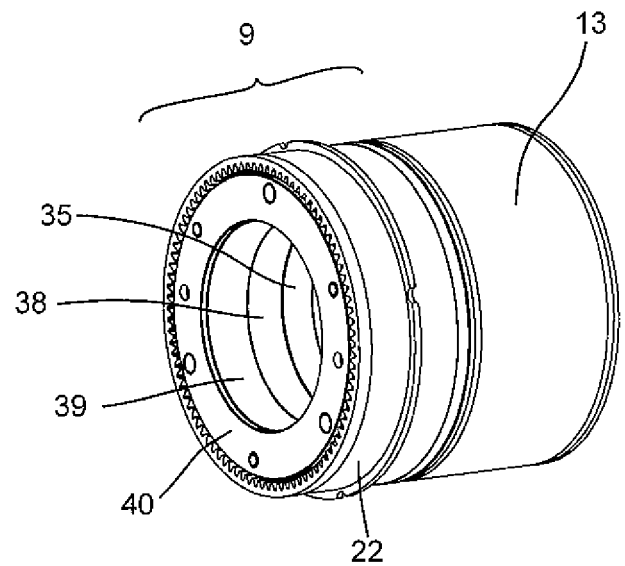
FIG. 17 is a perspective view of the inner magnetic cartridge attached to the planetary gear assembly.

FIG. 16 is a partial exploded view of the inner magnetic cartridge and the planetary gear assembly, and FIG. 17 is a perspective view of the inner magnetic cartridge attached to the planetary gear assembly. The planetary gear assembly 9, and more particularly, the first disc 24 (not shown), is attached to the inner magnetic cartridge 13 with pins 36. Any method of attaching the planetary gear assembly 9 to the inner magnetic cartridge 13 may be used.

Figure 18:
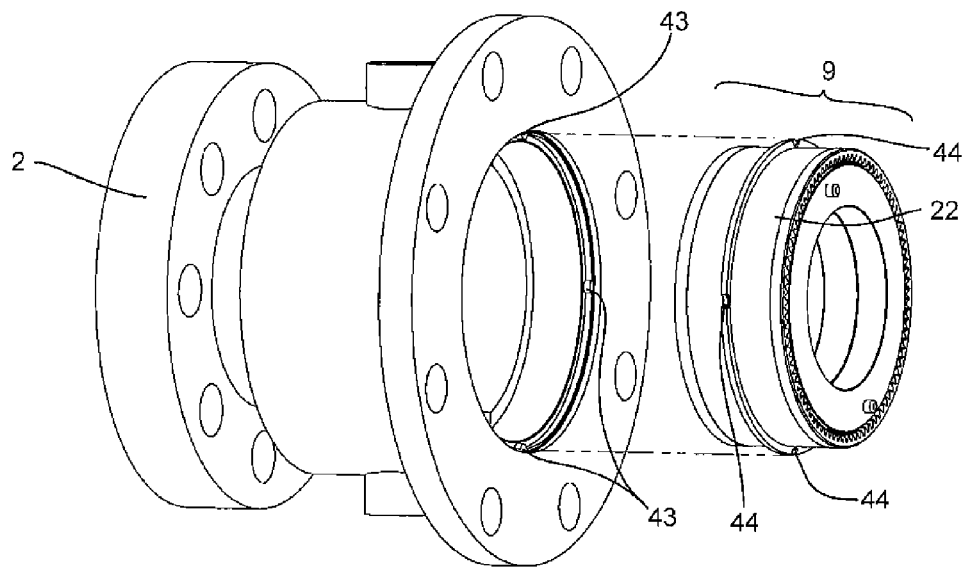
FIG. 18 is an exploded view of the second flange and planetary gear assembly.
Figure 19:
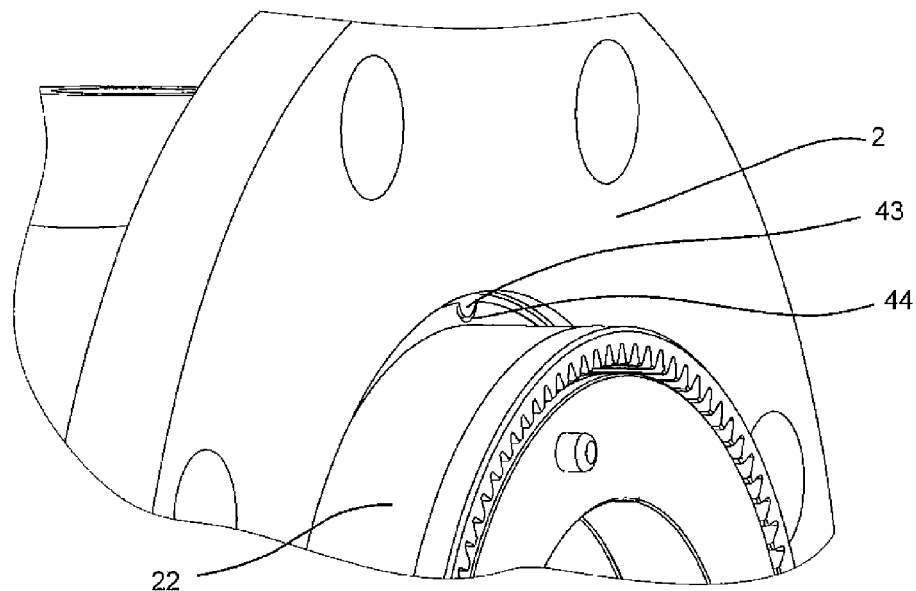
FIG. 19 is a cropped perspective view of the second flange and planetary gear assembly.

FIG. 18 is an exploded view of the second flange and planetary gear assembly. As shown in this figure, the planetary gear assembly 9 slides into the second flange 2. FIG. 19 is a cropped perspective view of the second flange and planetary gear assembly. As shown in this figure, the planetary gear assembly 9 is aligned within the second flange 2 by fitting the keys 43 that extend from the inner wall of the second flange into the slots 44 on the outer ring 22 of the planetary gear assembly 9.

Figure 20:
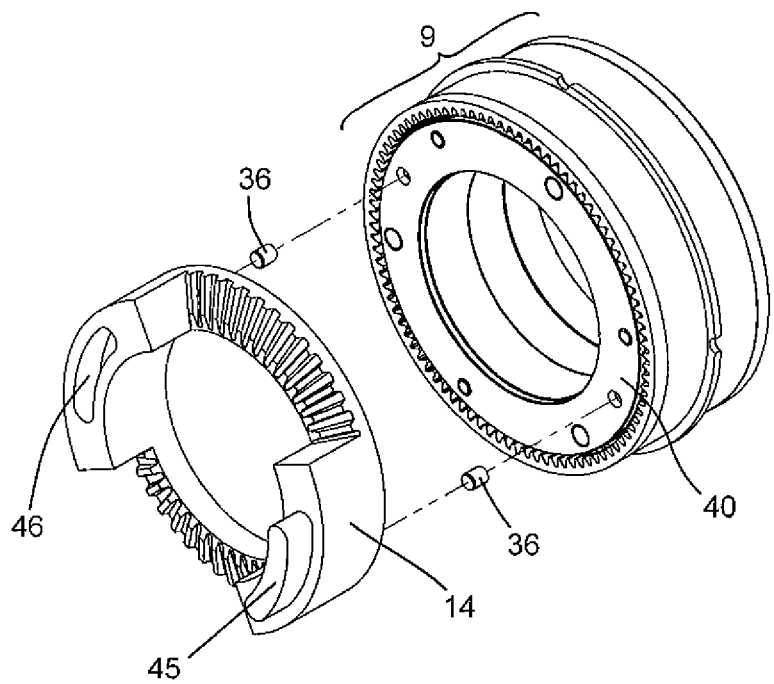
FIG. 20 is an exploded view of the bull gear and planetary gear assembly.
Figure 21:
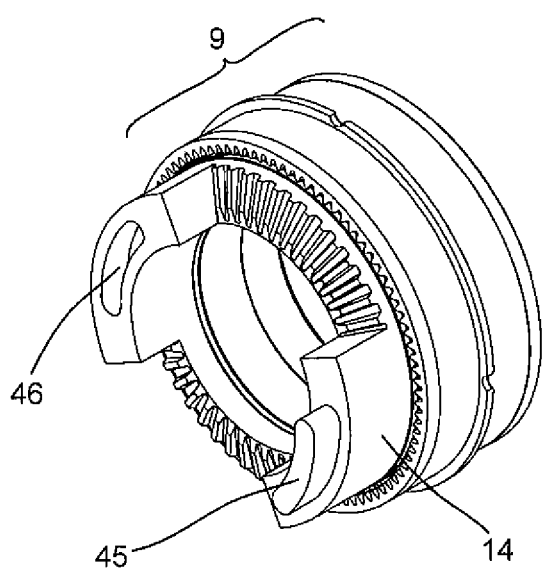
FIG. 21 is a perspective view of the bull gear attached to the planetary gear assembly.

FIG. 20 is an exploded view of the bull gear and planetary gear assembly, and FIG. 21 is a perspective view of the bull gear attached to the planetary gear assembly. The bull gear 14 is attached to the planetary gear assembly 9, and more particularly, to the interface disc 40 of the third planetary gear phase 33, with pins 36. Any method of attaching the bull gear 14 to the planetary gear assembly 9 may be used. Note that only one half of the bull gear 14 is shown in FIGS. 20 and 21; the two halves of the bull gear 14 are affixed to one another by fitting a male part 45 into a female part 46 on each half of the bull gear 14.

Figure 22:
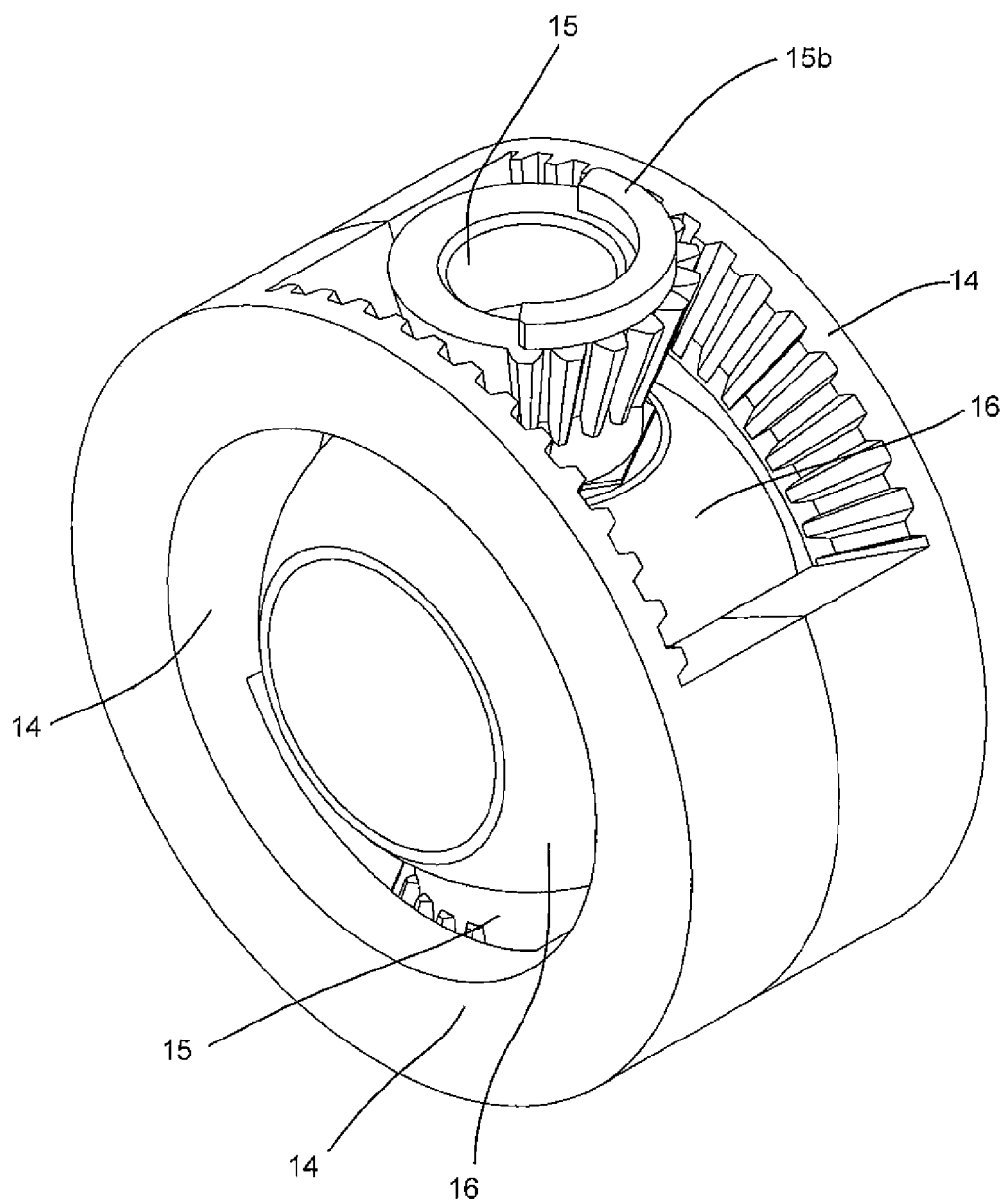
FIG. 22 is a perspective view of the bull gear and ball gear with the valve in an open position.
Figure 23:
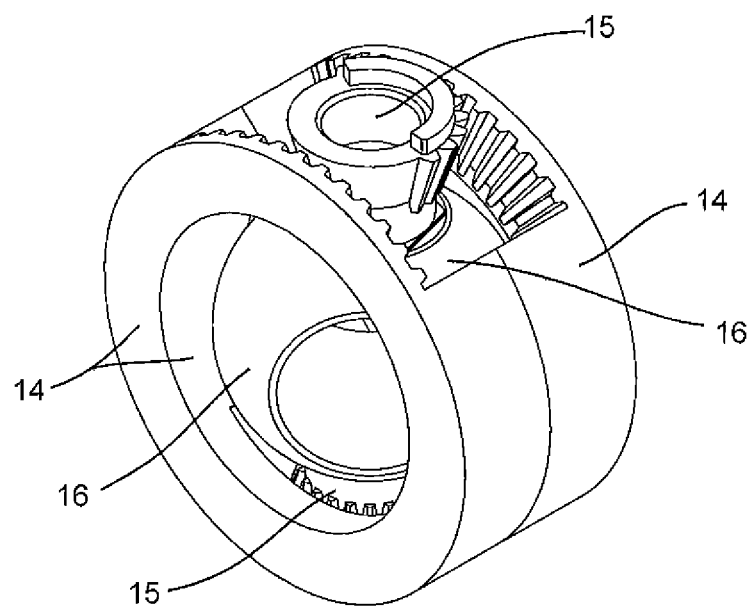
FIG. 23 is a perspective view of the bull gear and ball gear with the valve in a partially open position.
Figure 24:
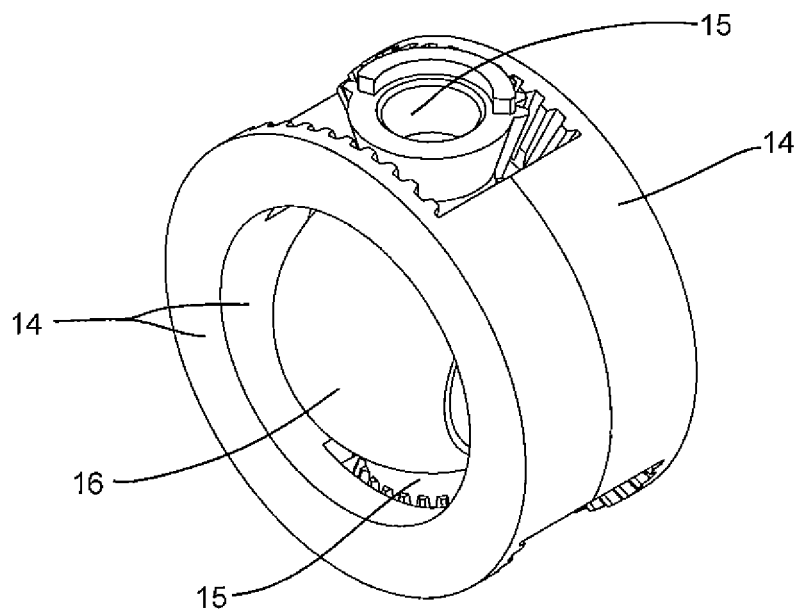
FIG. 24 is a perspective view of the bull gear and ball gear with the valve in a closed position.

FIG. 22 is a perspective view of the bull gear and ball gear with the valve in an open position, FIG. 23 is a perspective view of the bull gear and ball gear with the valve in a partially open position, and FIG. 24 is a perspective view of the bull gear and ball gear with the valve in a closed position. These three figures illustrate the position of the ball relative to the bevel 15 and bull 14 gears.

Figure 22A:
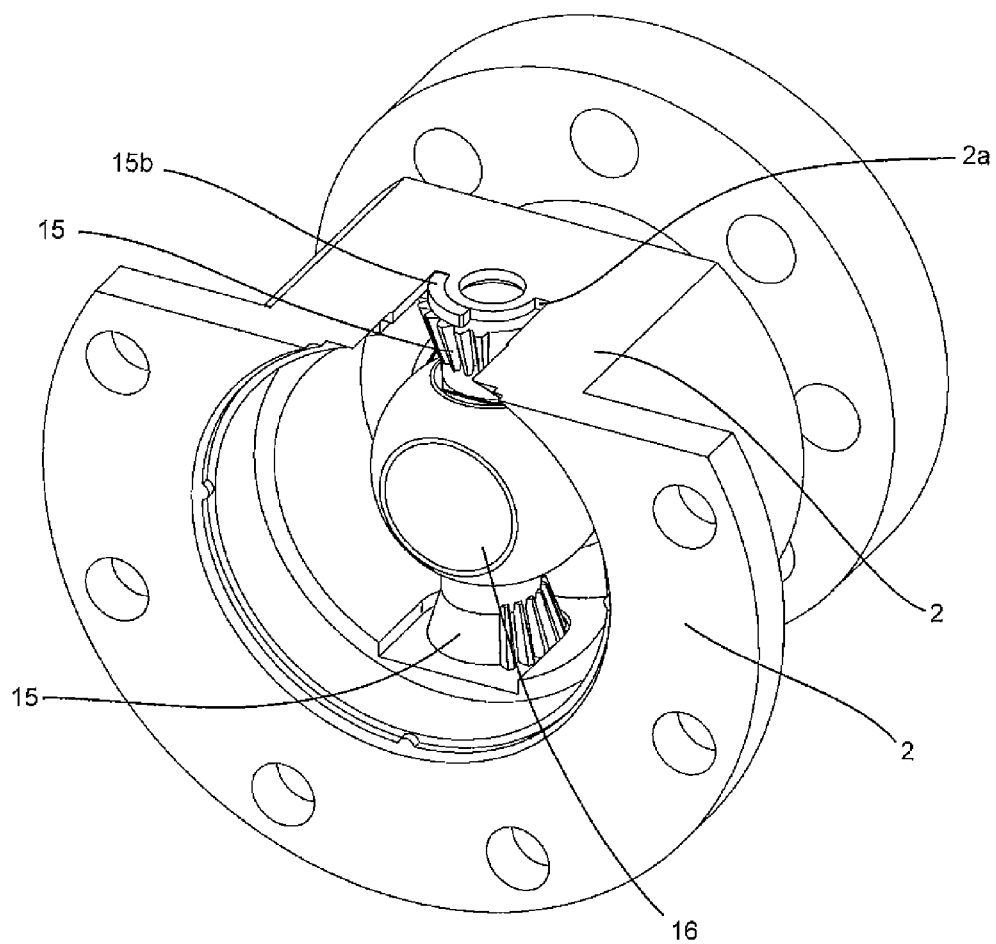
FIG. 22A is cropped perspective view illustrating operation of the ball stop on the ball gear.

FIG. 22A shows the ball stop 15b protruding from the top of the ball gear 15. The second flange 2 preferably comprises a channel 2a in which the ball stop 15b resides. The length of the ball stop 15b and the length of the channel 2a are such that the ball stop 15b prevents the ball from rotating more than ninety degrees (90°).

Figure 25:
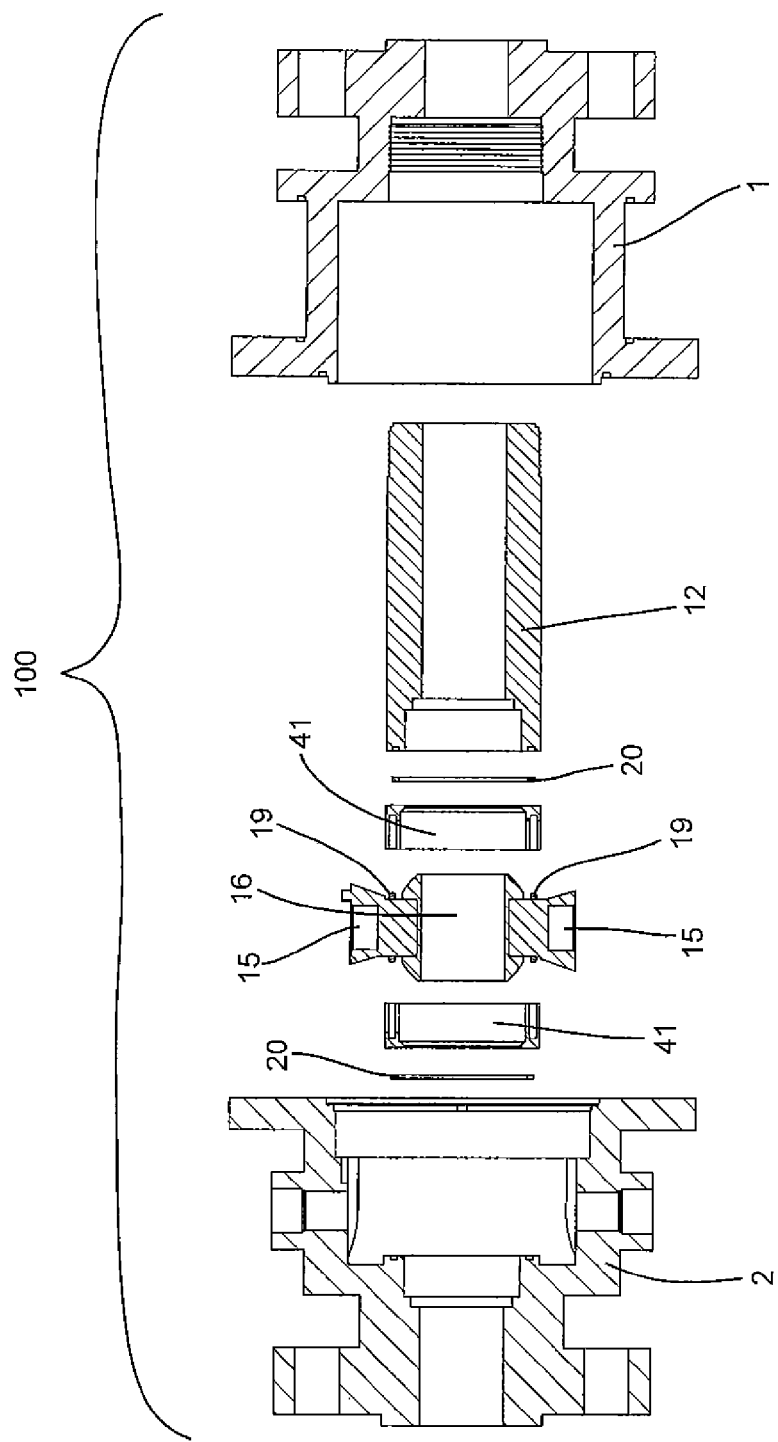
FIG. 25 is an exploded section view of those parts of the valve that seal off the gear compartment.
Figure 26:
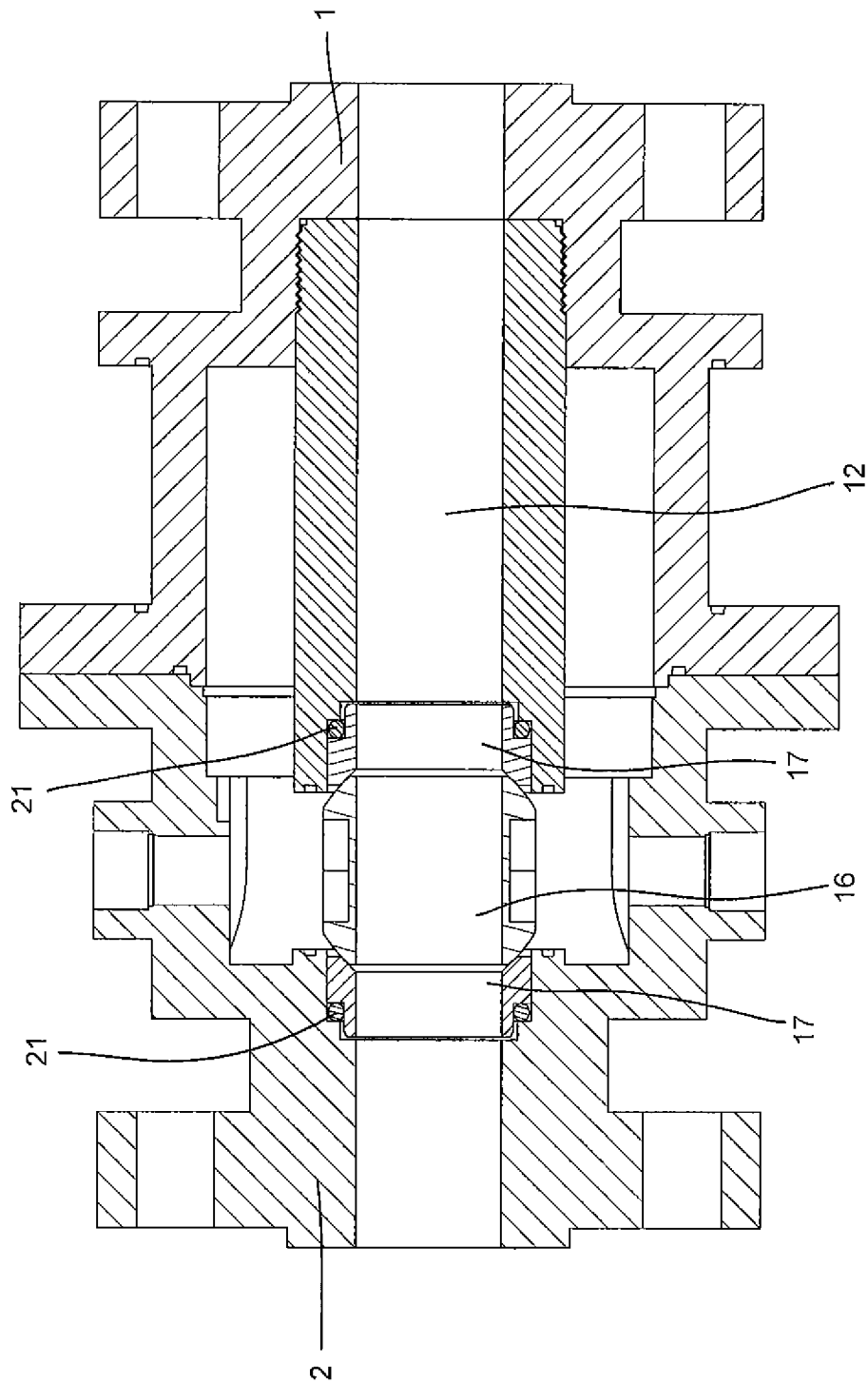
FIG. 26 is a section view of the valve illustrating the flow path and the position of the ball seat relative to the ball.

FIG. 25 is an exploded section view of those parts of the valve that seal off the gear compartment. FIG. 26 is a section view of the valve illustrating the flow path and the position of the ball seat relative to the ball.

Figure 27:
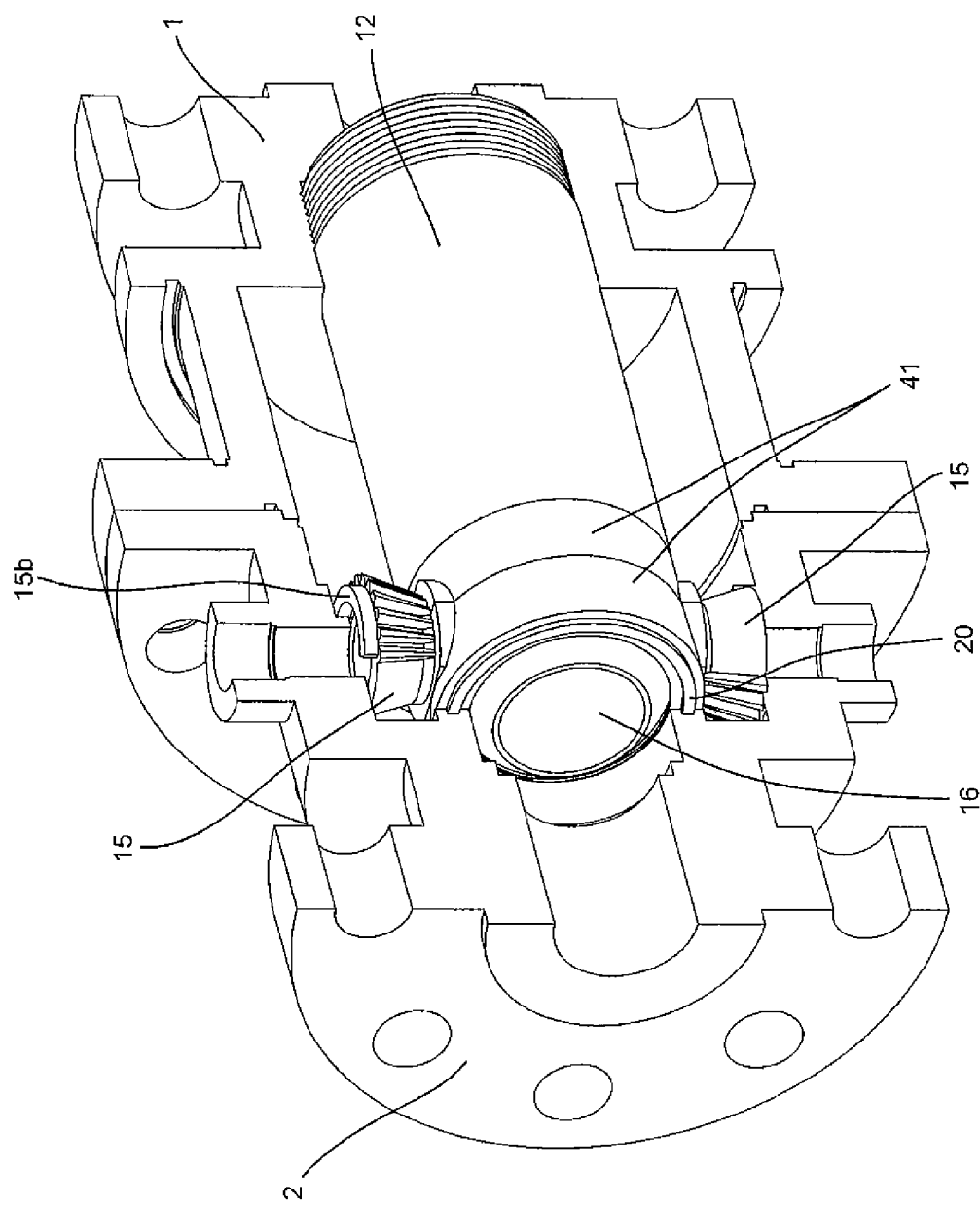
FIG. 27 is a perspective cutaway view of the same components shown in FIGS. 25 and 26.

FIG. 27 is a perspective cutaway view of the same components shown in FIG. 25. This figure shows the flow tube 12 in relation to the ball gear seal rings 41 that surround the ball 16. This figure also shows the spring seal 20 that is situated between the ball gear seal ring 41 and the second flange 2. The spring seal 20 that is shown in this figure is the same one that is shown in FIG. 13. The ball seat 17 keeps any solid particles form interfering with the gears when the valve is in a fully open position, and the flow tube 12 and ball gear seal rings 41 keep any solid particles from interfering with the gears when the valve is in any position other than fully open. Note that the two ball gear seal rings 41 on either side of the ball form a collar around the ball, as previously stated.

Figure 30:
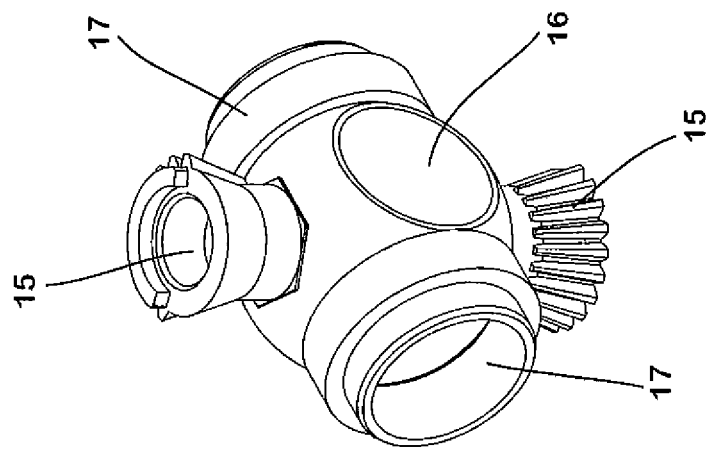
FIG. 30 is a perspective view of the ball, ball gears and ball seat with the valve in a closed position.
Figure 29:
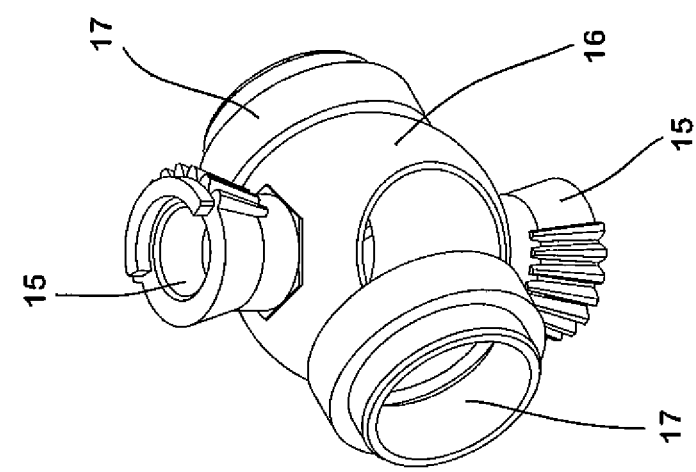
FIG. 29 is a perspective view of the ball, ball gears and ball seat with the valve in a partially open position.
Figure 28:
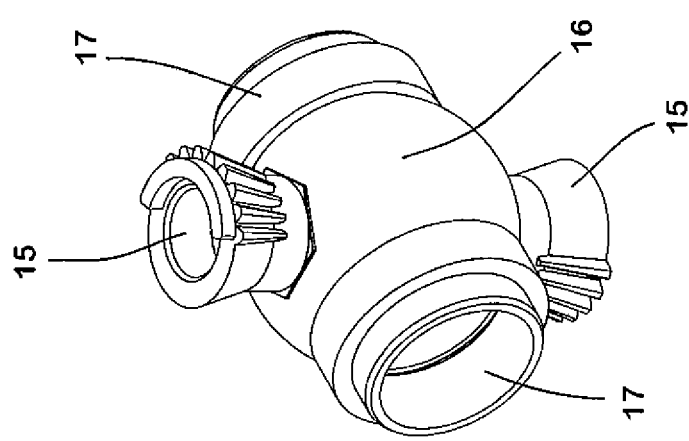
FIG. 28 is a perspective view of the ball, ball gears and ball seat with the valve in an open position.

FIG. 28 is a perspective view of the ball, ball gears and ball seat with the valve in an open position, FIG. 29 is a perspective view of the ball, ball gears and ball seat with the valve in a partially open position, and FIG. 30 is a perspective view of the ball, ball gears and ball seat with the valve in a closed position. These three figures show in greater detail the orientation of the ball 16 and ball gears 15 in relation to the ball seat 17.

Figure 31:
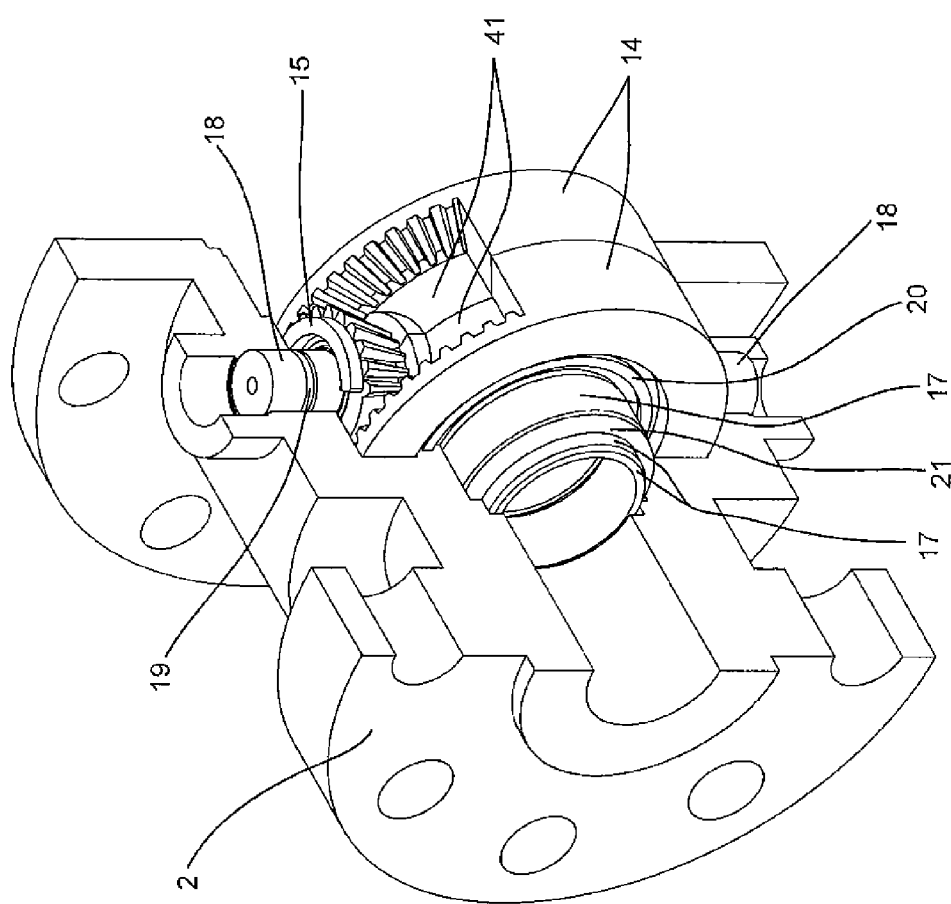
FIG. 31 is a perspective cutaway view of the ball assembly positioned in the second flange.

FIG. 31 is a perspective cutaway view of the ball assembly positioned in the left flange. This figure differs from FIG. 27 in that it shows the trunnions 18 that extend into the second flange 2 and the center of the ball gears 15. It also shows the bull gear 14 and ball gear seal ring 41. The spring seal 20, rubber gasket 21 and ball seat 17 are also shown.

Figure 32:
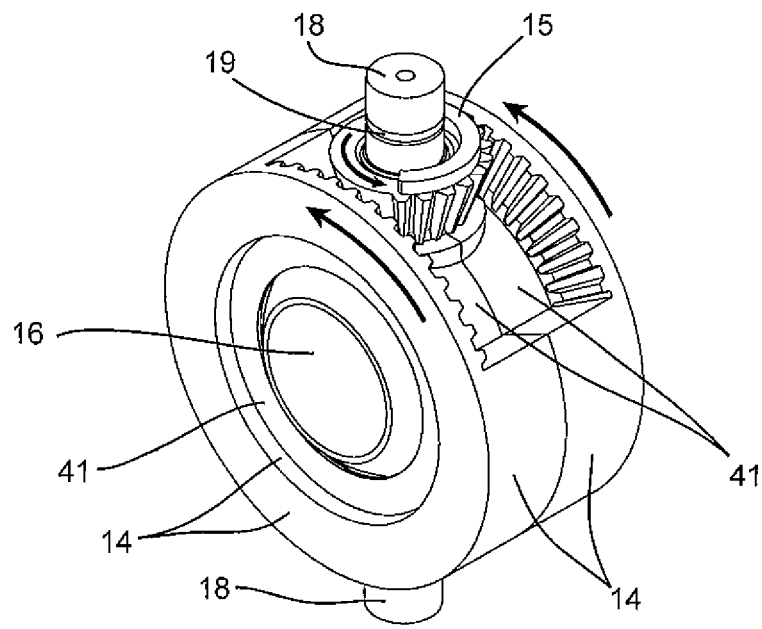
FIG. 32 is a first perspective view of the ball assembly illustrating the interaction between the bull and ball gears.
Figure 33:
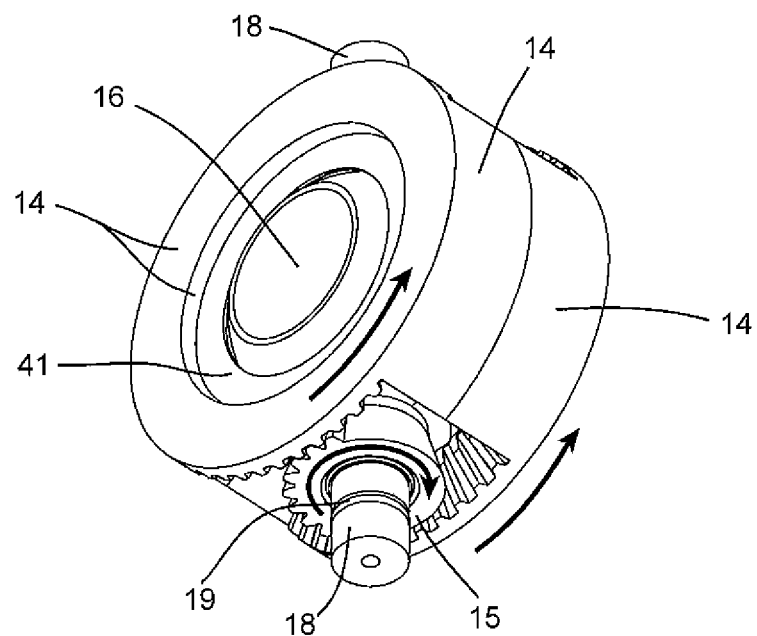
FIG. 33 is a second perspective view of the ball assembly illustrating the interaction between the bull and ball gears.

FIG. 32 is a first (top) perspective view of the ball assembly illustrating the interaction between the bull and ball gears, and FIG. 33 is a second (bottom) perspective view of the ball assembly illustrating the interaction between the bull and ball gears. These two figures together illustrate the direction of movement of the bull gear 14 in relation to the ball gears 15, as indicated by the arrows. The trunnions do not rotate; instead, the ball gears 15 (which are fixedly attached to the ball 16) rotate about the trunnions 18 via the trunnion bearing 42. The trunnion bearing 42 preferably comprises a smooth, slipper outer surface that contacts the trunnion 18.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A stemless ball valve comprising:
   (a) a first flange;
   (b) a second flange;
   (c) a ball assembly;
   (d) an inner magnetic cartridge;
   (e) an outer magnetic cartridge; and
   (f) a planetary gear assembly;
   wherein the inner magnetic cartridge is situated inside of the outer magnetic cartridge, and wherein the inner and outer magnetic cartridges actuate the valve;
   wherein the planetary gear assembly is situated between the inner magnetic cartridge and the ball assembly and provides an increase in torque from the inner magnetic cartridge to the ball assembly;
   wherein the planetary gear assembly is attached to the inner magnetic cartridge;
   wherein the first and second flanges are secured to each other to provide a leak-free environment; and
   wherein the planetary gear assembly is situated within the leak-free environment created by the first and second flanges.

2. The stemless ball valve of claim 1, wherein the planetary gear assembly comprises planetary gear phases, and wherein each planetary gear phase comprises a step-down gear.

3. The stemless ball valve of claim 2, wherein each step-down gear has a width, and wherein the width of each step-down gear increases from the planetary gear phase closest to the inner magnetic cartridge to the planetary gear phase closest to the ball.

4. The stemless ball valve of claim 2, wherein each planetary gear phase comprises one or more planetary gears, wherein the planetary gear assembly comprises an outer ring with inner teeth, and wherein each planetary gear engages with the inner teeth of the outer ring and with a step-down gear.

5. The stemless ball valve of claim 2, wherein the inner magnetic cartridge is attached to the planetary gear phase that is closest to the inner magnetic cartridge.

6. The stemless ball valve of claim 2, further comprising a ball gear on at least one side of the ball, wherein the ball gear is attached to the planetary gear phase that is closest to the ball.

7. The stemless ball valve of claim 6, further comprising a ball gear that is attached to the ball, wherein the ball gear and the ball gear each comprises a plurality of teeth, and wherein the teeth on the ball gear engage with the teeth on the ball gear so that when the ball gear rotates, it causes the ball to rotate.

8. The stemless ball valve of claim 7, further comprising a trunnion axle, wherein the ball gear comprises a center, and wherein the trunnion axle passes through the center of the ball gear.

9. The stemless ball valve of claim 7, further comprising a trunnion bearing, wherein the ball gear comprises a base portion, wherein the trunnion bearing is situated inside of the base portion of the ball gear, and wherein the trunnion axle rotates inside of the trunnion bearing.

10. The stemless ball valve of claim 8, wherein the trunnion axle is secured to the second flange.

11. The stemless ball valve of claim 1, further comprising a flow tube, wherein the valve has a flow path, and wherein the flow tube is situated between the inner magnetic cartridge and the flow path.

12. The stemless ball valve of claim 11, further comprising two ball gear seal rings that form a collar around the ball.

13. The stemless ball valve of claim 12, further comprising a spring seal that is situated between the flow tube and one of the two ball gear seal rings.

14. The stemless ball valve of claim 11, further comprising a ball gear on at least one side of the ball, wherein the ball gear is attached to the planetary gear phase that is closest to the ball, and further comprising a ball gear that is attached to the ball, wherein the ball gear and the ball gear each comprises a plurality of teeth, and wherein the teeth on the ball gear engage with the teeth on the ball gear so that when the ball gear rotates, it causes the ball to rotate, and wherein the planetary gear assembly, ball gear and ball gear are all located outside of the flow path.

15. The stemless ball valve of claim 1, further comprising a ball seat on either side of the ball.

16. The stemless ball valve of claim 1, further comprising a ball stop on the ball that interacts with the second flange to prevent the ball from rotating more than ninety degrees.

* * * * *